United States Patent
Kevelos et al.

(10) Patent No.: US 12,402,009 B2
(45) Date of Patent: *Aug. 26, 2025

(54) COMMUNICATION ENABLED CIRCUIT BREAKERS AND CIRCUIT BREAKER PANELS

(71) Applicant: LEVITON MANUFACTURING CO., INC., Melville, NY (US)

(72) Inventors: Adam Kevelos, Plainview, NY (US); Alfred J. Lombardi, Syosset, NY (US); Michael Ostrovsky, Brooklyn, NY (US); Paul Soccoli, Plainview, NY (US)

(73) Assignee: Leviton Manufacturing Co., Inc., Melville, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/490,937

(22) Filed: Oct. 20, 2023

(65) Prior Publication Data

US 2024/0056822 A1 Feb. 15, 2024

Related U.S. Application Data

(63) Continuation of application No. 17/696,000, filed on Mar. 16, 2022, now Pat. No. 11,818,582, which is a
(Continued)

(51) Int. Cl.
*H04W 12/50* (2021.01)
*G01R 31/327* (2006.01)
(Continued)

(52) U.S. Cl.
CPC ........ *H04W 12/50* (2021.01); *G01R 31/3277* (2013.01); *G01R 31/74* (2020.01);
(Continued)

(58) Field of Classification Search
CPC ....... H04W 12/50; H04W 4/80; H04W 12/03; H04W 12/0471; H04W 76/11;
(Continued)

(56) References Cited

U.S. PATENT DOCUMENTS

| 5,223,795 A | 6/1993 | Blades |
| 5,436,604 A | 7/1995 | Mrenna et al. |

(Continued)

FOREIGN PATENT DOCUMENTS

| EP | 3002648 A2 | 4/2016 | |
| WO | WO-2011091429 A2 * | 7/2011 | ......... H02H 1/0015 |
| WO | WO-2014018434 A2 * | 1/2014 | ......... H01H 71/123 |

OTHER PUBLICATIONS

Allen-Bradley, Rockwell Software Rockwell Automation, "Supplementary Protectors/Miniature circuit breakers" Catalog Nos. 1492-SP Series C, Apr. 2011, p. 31.
(Continued)

*Primary Examiner* — Brian A Zimmerman
*Assistant Examiner* — Cal J Eustaquio
(74) *Attorney, Agent, or Firm* — KDW Firm PLLC

(57) ABSTRACT

Communication enabled circuit breakers and circuit breaker panels are described. Methods associated with such communication enabled circuit breakers and circuit breaker panels are also described. A circuit breaker panel may include a circuit breaker controller and one or more communication enabled circuit breakers. Two-way wireless communication is possible between the circuit breaker controller and the one or more communication enabled circuit breakers.

25 Claims, 7 Drawing Sheets

Related U.S. Application Data continuation of application No. 16/485,491, filed as application No. PCT/US2018/019857 on Feb. 27, 2018, now Pat. No. 11,297,506.

(60) Provisional application No. 62/612,657, filed on Jan. 1, 2018, provisional application No. 62/612,656, filed on Jan. 1, 2018, provisional application No. 62/612,654, filed on Jan. 1, 2018, provisional application No. 62/500,051, filed on May 2, 2017, provisional application No. 62/465,046, filed on Feb. 28, 2017.

(51) Int. Cl.

| | | |
|---|---|---|
| *G01R 31/74* | (2020.01) | |
| *G05B 13/02* | (2006.01) | |
| *G05B 19/042* | (2006.01) | |
| *G06F 8/65* | (2018.01) | |
| *G08B 5/36* | (2006.01) | |
| *G08C 17/02* | (2006.01) | |
| *H01H 71/04* | (2006.01) | |
| *H02H 1/00* | (2006.01) | |
| *H02H 3/10* | (2006.01) | |
| *H02H 7/26* | (2006.01) | |
| *H04L 9/08* | (2006.01) | |
| *H04L 12/28* | (2006.01) | |
| *H04L 67/00* | (2022.01) | |
| *H04Q 9/00* | (2006.01) | |
| *H04W 4/80* | (2018.01) | |
| *H04W 12/03* | (2021.01) | |
| *H04W 12/0471* | (2021.01) | |
| *H04W 76/11* | (2018.01) | |
| *H04W 76/14* | (2018.01) | |
| *G06F 7/58* | (2006.01) | |

(52) U.S. Cl.
CPC ....... *G05B 13/028* (2013.01); *G05B 19/0426* (2013.01); *G06F 8/65* (2013.01); *G08B 5/36* (2013.01); *G08C 17/02* (2013.01); *H01H 71/04* (2013.01); *H02H 1/0007* (2013.01); *H02H 1/0061* (2013.01); *H02H 1/0092* (2013.01); *H02H 3/10* (2013.01); *H02H 7/263* (2013.01); *H04L 9/0841* (2013.01); *H04L 12/2816* (2013.01); *H04L 67/34* (2013.01); *H04Q 9/00* (2013.01); *H04W 4/80* (2018.02); *H04W 12/03* (2021.01); *H04W 12/0471* (2021.01); *H04W 76/11* (2018.02); *H04W 76/14* (2018.02); *G05B 2219/25112* (2013.01); *G06F 7/588* (2013.01); *G08C 2201/93* (2013.01); *H04L 2209/805* (2013.01); *H04Q 2209/43* (2013.01)

(58) Field of Classification Search
CPC ... H04W 76/14; G01R 31/3277; G01R 31/74; G01R 31/327; G05B 13/028; G05B 19/0426; G05B 2219/25112; G06F 8/65; G06F 7/588; G06F 8/654; G08B 5/36; G08C 17/02; G08C 2201/93; H01H 71/04; H01H 9/168; H01H 2083/205; H02H 1/0007; H02H 1/0061; H02H 1/0092; H02H 3/10; H02H 7/263; H02H 7/261; H04L 9/0841; H04L 12/2816; H04L 67/34; H04L 2209/805; H04L 12/28; H04Q 9/00; H04Q 2209/43; H04Q 2209/60; H04Q 2209/40; Y02D 10/00
See application file for complete search history.

(56) References Cited

U.S. PATENT DOCUMENTS

| | | |
|---|---|---|
| 5,467,286 A | 11/1995 | Pyle et al. |
| 5,486,755 A | 1/1996 | Horan et al. |
| 5,629,869 A | 5/1997 | Johnson et al. |
| 5,805,813 A | 9/1998 | Schweitzer, III |
| 6,034,586 A * | 3/2000 | Runyan .............. H01H 71/1045 335/8 |
| 6,055,144 A | 4/2000 | Reid |
| 6,195,243 B1 | 2/2001 | Spencer et al. |
| 6,246,928 B1 | 6/2001 | Louis et al. |
| 6,292,717 B1 | 9/2001 | Alexander et al. |
| 6,295,190 B1 | 9/2001 | Rinaldi et al. |
| 6,473,794 B1 | 10/2002 | Guheen et al. |
| 6,628,496 B2 | 9/2003 | Montjean |
| 7,493,221 B2 | 2/2009 | Caggiano et al. |
| 7,546,214 B2 | 6/2009 | Rivers, Jr. et al. |
| 7,558,038 B2 | 7/2009 | Wiese et al. |
| 7,719,257 B2 | 5/2010 | Robarge et al. |
| 8,463,453 B2 | 6/2013 | Parsons, Jr. |
| 8,681,463 B2 | 3/2014 | Franks et al. |
| 8,719,123 B2 | 5/2014 | Rohrbaugh |
| 9,432,214 B2 | 8/2016 | Lal et al. |
| 9,438,026 B2 | 9/2016 | Franks et al. |
| 9,715,796 B2 | 7/2017 | Reid |
| 9,853,458 B1 | 12/2017 | Bell |
| 10,063,592 B1 | 8/2018 | McClintock |
| 2002/0075616 A1* | 6/2002 | Montjean .............. H02H 1/0061 361/79 |
| 2003/0086228 A1 | 5/2003 | Papallo, Jr. et al. |
| 2003/0167373 A1 | 9/2003 | Winters et al. |
| 2005/0116814 A1 | 6/2005 | Rodgers et al. |
| 2005/0168891 A1* | 8/2005 | Nilman-Johansson ...................... H01H 11/0062 361/23 |
| 2005/0225909 A1 | 10/2005 | Yoshizaki |
| 2006/0050870 A1 | 3/2006 | Kimmel et al. |
| 2006/0087783 A1* | 4/2006 | Holley .................. H02H 3/042 361/81 |
| 2006/0238932 A1 | 10/2006 | Westbrock et al. |
| 2007/0143043 A1 | 6/2007 | Wafer et al. |
| 2007/0188954 A1* | 8/2007 | Wiese .................. H02H 3/006 361/62 |
| 2007/0194942 A1 | 8/2007 | Darr |
| 2008/0079437 A1 | 4/2008 | Robarge et al. |
| 2008/0142486 A1 | 6/2008 | Vicente et al. |
| 2008/0209429 A1 | 8/2008 | Van Riel |
| 2008/0231485 A1 | 9/2008 | Newlin et al. |
| 2008/0255782 A1 | 10/2008 | Bilac et al. |
| 2009/0206059 A1 | 8/2009 | Kiko |
| 2011/0150482 A1 | 6/2011 | Furusawa et al. |
| 2011/0279933 A1 | 11/2011 | Campolo et al. |
| 2012/0098347 A1 | 4/2012 | Beierschmitt et al. |
| 2012/0123762 A1 | 5/2012 | Studer, II |
| 2012/0140431 A1 | 6/2012 | Faxvog et al. |
| 2012/0262093 A1 | 10/2012 | Recker et al. |
| 2013/0029596 A1 | 1/2013 | Preston et al. |
| 2013/0329331 A1 | 12/2013 | Erger |
| 2014/0134951 A1 | 5/2014 | Paulson |
| 2014/0146431 A1 | 5/2014 | Franks et al. |
| 2014/0193294 A1 | 7/2014 | Kain et al. |
| 2014/0197856 A1 | 7/2014 | Ostrovsky et al. |
| 2014/0211345 A1 | 7/2014 | Thompson |
| 2014/0300486 A1 | 10/2014 | Hummel et al. |
| 2014/0340222 A1 | 11/2014 | Thornton et al. |
| 2015/0162157 A1 | 6/2015 | Luebke et al. |
| 2015/0168487 A1 | 6/2015 | Parker |
| 2015/0188975 A1 | 7/2015 | Hansen et al. |
| 2015/0207301 A1 | 7/2015 | Franks et al. |
| 2015/0296599 A1 | 10/2015 | Recker et al. |
| 2015/0338472 A1 | 11/2015 | Nuqui |
| 2016/0099749 A1 | 4/2016 | Bennett et al. |
| 2016/0100310 A1 | 4/2016 | Lee |
| 2016/0163186 A1 | 6/2016 | Davidson |
| 2016/0181036 A1 | 6/2016 | Langdon |
| 2016/0225562 A1 | 8/2016 | Franks et al. |

(56) References Cited

U.S. PATENT DOCUMENTS

| | | |
|---|---|---|
| 2016/0231375 A1 | 8/2016 | Roemer et al. |
| 2016/0282828 A1 | 9/2016 | Jauquet et al. |
| 2017/0005462 A1* | 1/2017 | Williams ............... H01H 71/74 |
| 2017/0064798 A1 | 3/2017 | Economy et al. |
| 2017/0163023 A1 | 6/2017 | Niehoff |
| 2018/0129801 A1 | 5/2018 | Cambou |
| 2018/0278724 A1 | 9/2018 | Erdelyi |
| 2020/0264234 A1 | 8/2020 | Miller et al. |

OTHER PUBLICATIONS

Elmark, "Technical Specification—Minature circuit breakers (MCB) C60DC Series", pp. 3 and 4.
International Search Report and Written Opinion for Application No. PCT/US2018/019852 mailed on May 15, 2018, 13 pages.
International Search Report and Written Opinion for Application No. PCT/US2018/019856, mailed on May 11, 2018, 14 pages.
International Search Report and Written Opinion for Application No. PCT/US2018/019857, mailed on Jun. 27, 2018, 14 pages.
International Search Report and Written Opinion for Application No. PCT/US2018/019859, mailed on May 16, 2018, 11 pages.
Techterms, "Overwrite", Techterms.com/definition/overwrite, Feb. 29, 2012.

* cited by examiner

COMMUNICATION ENABLED CIRCUIT BREAKERS AND CIRCUIT BREAKER PANELS

CROSS-REFERENCE TO RELATED APPLICATIONS

This is a continuation application of pending U.S. patent application Ser. No. 17/696,000, filed Mar. 16, 2022, entitled "Communication Enabled Circuit Breakers and Circuit Breaker Panels,", which is a continuation application of U.S. patent application Ser. No. 16/485,491, filed Aug. 13, 2019, now U.S. Pat. No. 11,297,506, entitled "Communication Enabled Circuit Breakers and Circuit Breaker Panels," which application is a United States National Phase filing of International Application No. PCT/US2018/019857, filed Feb. 27, 2018, which claims the benefit of U.S. Provisional Application Ser. No. 62/465,046, filed Feb. 28, 2017, entitled "Wireless Communication Enabled Circuit Breakers and Circuit Breaker Panels;" U.S. Provisional Application Ser. No. 62/500,051, filed May 2, 2017, entitled "Wireless Communication Enabled Circuit Breakers and Circuit Breaker Panels;" U.S. Provisional Application Ser. No. 62/612,654, filed Jan. 1, 2018, entitled "Secure Communication for Commissioning and Decommissioning Circuit Breakers and Panel System;" U.S. Provisional Application Ser. No. 62/612,656, filed Jan. 1, 2018, entitled "Communication Enabled Circuit Breakers;" and U.S. Provisional Application Ser. No. 62/612,657, filed Jan. 1, 2018, entitled "Communication Enabled Circuit Breakers;" which applications are incorporated herein by reference in their entirety.

FIELD OF THE DISCLOSURE

The present invention relates generally to circuit breakers. More particularly, the present invention relates to communication enabled circuit breakers and circuit breaker panels that house circuit breakers.

BACKGROUND OF THE DISCLOSURE

Circuit breakers provide protection in electrical systems by disconnecting a load from a power supply based on certain fault conditions, e.g., ground fault, arc fault, overcurrent. In general, circuit breakers monitor characteristics of the electrical power supplied to branch circuits. The circuit breakers function to interrupt, open, 'trip' or 'break' the connection between the power supply and a branch circuit when fault conditions (e.g., arc faults, ground faults, and unsafe overcurrent levels) are detected on the supplied branch, e.g., automatically open a switch to disconnect the branch from the power supply when such fault conditions are detected.

Existing circuit breaker panels and circuit breakers housed by such panels may provide limited information to electricians and consumers about the nature of the fault conditions observed by the circuit breakers. For example, electricians and consumers may be able to determine that a circuit breaker has tripped by visual inspection of the circuit breaker or if power is lost on one or more loads. The visual inspection of the circuit breaker generally requires observing an operating switch associated with the circuit breaker. The operating switch of the circuit breaker is provided to allow for manually opening and closing contacts of the circuit breaker. The operating switch is also typically used to reset the circuit breaker after the circuit breaker has tripped due to a detected fault condition.

It is to be appreciated, that circuit breakers are typically installed in circuit breaker panels, which are themselves typically located in dedicated electrical rooms, basements, garages, outdoor spaces, etc. Additionally, circuit breaker panels often include a door or cover that limits access to the circuit breakers housed therein. Therefore, locating, inspecting and/or resetting deployed circuit breakers may be difficult. Furthermore, because circuit breakers generally require visual inspection to determine if a fault condition has occurred, property owners and/or residents may not immediately recognize when an electrical fault condition has caused a circuit breaker to trip. Failure to immediately recognize when an electrical fault condition has caused a circuit breaker to trip may cause damage to property and/or personal effects due to a loss of electricity to one or more loads.

DETAILED DESCRIPTION

Figure 1:
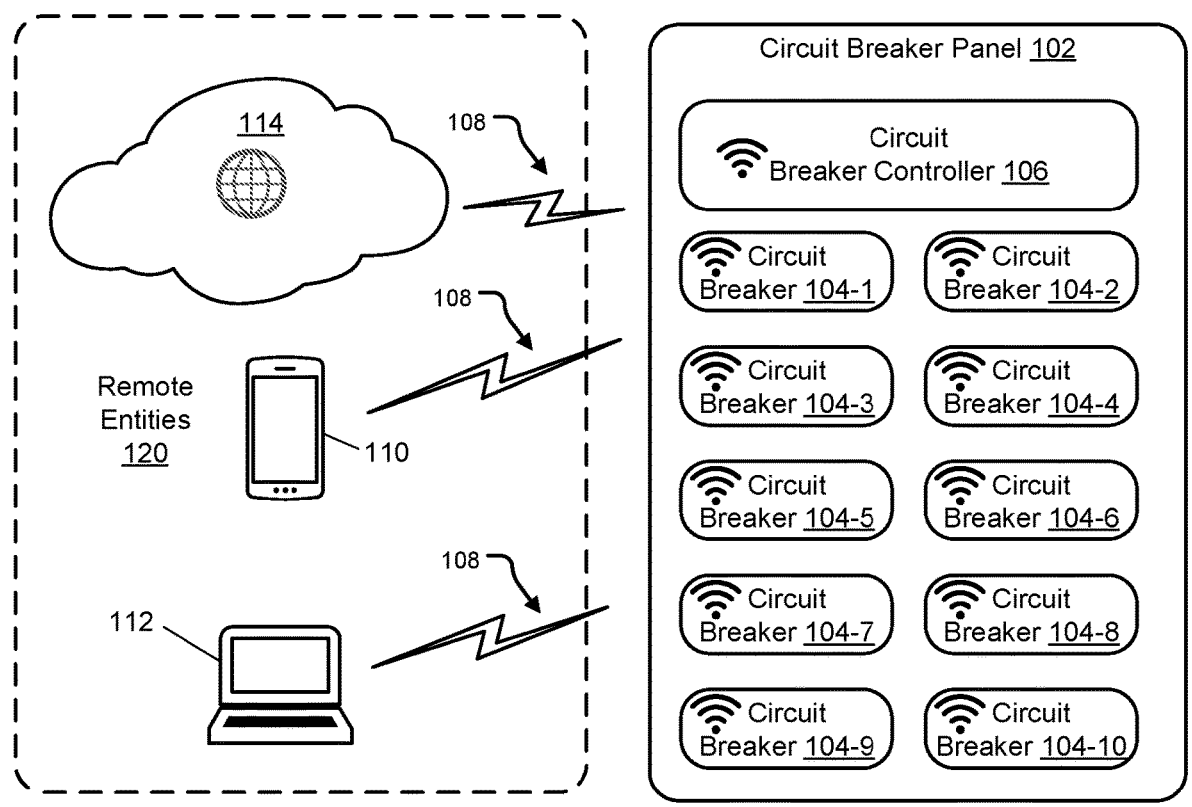
FIG. 1 illustrates a communication enabled circuit breaker and panel system in accordance with an exemplary embodiment.

Communication enabled circuit breakers and circuit breaker panels are provided. Methods associated with such communication enabled circuit breakers and circuit breaker panels are also provided.

Embodiments discussed herein, can provide a number of advantages over conventional devices. For example, the electrical components of the communication enabled circuit breaker is preferably advantageously supplied power from the line side phase and neutral electrical connections/terminations of the communication enabled circuit breaker, rather than the load side phase and neutral electrical connections/terminations typically used in conventional circuit breakers. Therefore, unlike conventional circuit breakers, a load side trip incident will not terminate power supplied to the electrical components, which includes the communication components of the circuit breaker. This is because some embodiments detailed herein provide communication components of communication enabled circuit breakers arranged to receive power from the line side phase and neutral. In the event of a trip incident, power is still available on the line side phase and neutral. Therefore, communication functionality is available even in the event of a trip incident.

In general, the functionality of conventional circuit breakers is fixed at the time of manufacture. Specifically, circuit breakers are not upgradable or reprogrammable in the field. Therefore, in the event that a circuit breaker is to be upgraded due to a change in load conditions, or the like, physical access to the circuit breaker may be required. Such physical access to the circuit breaker may require dispatching an electrician to the site of the circuit breaker in order to allow for removing the circuit breaker and replacing it with a model which includes the desired functionality. Therefore, upgrading or reprogramming of circuit breakers may be too time-consuming or costly to implement.

The embodiments detailed herein provide an advantage in that conditions in which circuit breakers interrupt faults can be updated and/or "customized" after manufacture, and even after initial deployment or installation. Accordingly, circuit breakers can be customized in the field and/or after installation to interrupt faults based on particular loads to which they are coupled and/or based on historical characteristics of the load. Thus, potentially reducing the number of unintentional fault interrupts that occur.

It is noted, that the present disclosure often uses examples of communication enabled circuit breakers and panels, which may be wirelessly coupled. It is to be appreciated that the examples given herein can be implemented using wired communication technologies (e.g., Ethernet, RS232, USB, or the like) instead of wireless communication technologies. As such, the use of the term "wireless" when referring to the communication technologies that may be implemented by the breakers and/or panels is not intended to be limiting to breakers and panels which only communicate wirelessly. Furthermore, system components can be referred to as "wireless" without implying that the elements recited thereto are devoid of wires or physical conductors/conductive paths.

FIG. 1 illustrates a communication enabled circuit breaker and panel system 100 in accordance with an exemplary embodiment. The communication enabled circuit breaker and panel system 100 includes a circuit breaker panel 102. The circuit breaker panel 102 may include any number of communication enabled circuit breakers 104-*n*, where n is a positive integer. For example, system 100 is depicted including communication enabled circuit breakers 104-1, 104-2, 104-3, 104-4, 104-5, 104-6, 104-7, 104-8, 104-9 and 104-10. It is noted, system 100 is depicted with communication enabled circuit breaker 104-1 to 104-10 for purposes of clarity and not limitation. For example, system 100 can include panel 102 having any number (e.g., 1, 2, 3, 4, or more) of communication enabled circuit breakers 104-*n*. Additionally, panel 102 may include both communication enabled circuit breakers (e.g., 104-1 to 104-10) as well as conventional circuit breakers (not shown).

Additionally, although each of the communication enabled circuit breakers 104-1 to 104-10 are labeled as breaker 104, it is to be understood that communication enabled circuit breakers 104-1 to 104-10 are not necessarily identical. For example, communication enabled circuit breaker 104-1 may be a ground fault circuit interrupter (GFCI) device; communication enabled circuit breaker 104-2 may be an arc fault circuit interrupter (AFCI) device; communication enabled circuit breaker 104-3 may be a conventional overcurrent circuit breaker, an overcurrent hydraulic-magnetic circuit breaker, an overcurrent thermal magnetic circuit breaker, or the like; communication enabled circuit breaker 104-4 may include both GFCI and AFCI functionalities. Furthermore, each of the communication enabled circuit breakers 104-1 to 104-10 may be rated for a predefined trip amperage or overcurrent state, and not necessarily the same predefined trip amperage or overcurrent state.

Furthermore, communication enabled circuit breakers 104-1 to 104-10 may be shaped and sized differently. For example, communication enabled circuit breaker 104-1 may be a double pole circuit breaker having a 2 inch width; communication enabled circuit breaker 104-2 may be a single circuit breaker having a 1 inch width; communication enabled circuit breaker 104-2 may be a circuit breaker having a ¾ inch width; communication enabled circuit breaker 104-2 may be a circuit breaker having a 1½ inch width; etc. The width of the communication enabled circuit breakers 104-1 to 104-10 refers to the shorter side of the generally rectangular visible face of the wireless circuit breakers 104-1 to 104-10 once it is installed in the circuit breaker panel 102.

Each of the communication enabled circuit breakers 104-1 to 104-10 may include communication components (refer to FIG. 2), which in some examples can be wireless. Such communication components associated with each of the communication enabled circuit breakers 104-1 to 104-10 may enable the communication enabled circuit breakers 104-1 to 104-10 to communicate (e.g., send and/or receive information elements including data, indications of operating conditions, instructions, updated fault interruption instructions, or the like) using any of a variety of communication standards. For example, in the case of wireless communication, the communication enabled circuit breakers 104-1 to 104-10 can include wireless communication components arranged to communicate via near field or personal area network communications protocols, e.g., Bluetooth® Low Energy (BLE) technology, thus enabling the communication enabled circuit breakers 104-1 to 104-10 to communicate using BLE communication schemes. In some implementations, the use of BLE is advantageous verses other wireless communication standards, such as standard Bluetooth®, since BLE requires less power, thereby minimizing the space required within the communication enabled circuit breakers 104 to house the circuitry. In the case of wired communication, the communication enabled circuit breakers 104-1 to 104-10 can include wired communication components arranged to communicate via a wired communication protocol, e.g., USB or MTP, thus enabling the wired circuit breakers to communicate using a wired communication scheme.

The circuit breaker panel 102 further houses a circuit breaker controller 106. The circuit breaker controller 106 may include communication components (refer to FIG. 3). In an alternative embodiment, the circuit breaker controller 106 is coupled to the circuit breaker panel 102 in an external arrangement. For example, the controller 106 could be housed in a different panel than panel 102 or disposed external to panel 102. The communication components associated with the circuit breaker controller 106 may enable the controller 106 to communicate (e.g., send and/or receive information elements including data, indications of operating conditions, instructions, updated fault interruption instructions, or the like) using any of a variety of communication standards.

For example, the wireless circuit breaker controller 106 can include wireless communication components arranged to communicate via BLE technology, thus enabling the wireless circuit breaker controller 106 to communicate using BLE communication schemes. Accordingly, the wireless circuit breaker controller 106 can communicate with the wireless circuit breakers 104 wirelessly, for example, using BLE communication schemes.

In general, the communication enabled circuit breakers 104-1 to 104-10 and the circuit breaker controller 106 (and particularly, the communication components of these devices) can be arranged to communicate using a variety of communication technologies, which may be wireless or wired in nature. For example, the circuit breaker controller 106 can be arranged to wirelessly communicate via Zig-Bee®, Z-Wave, Bluetooth®, Bluetooth® Low Energy (BLE), 6LowPan, Thread, Cellular, Sigfox®, NFC, Neul®, LoRaWAN™, or the like. In some implementations, the communication enabled circuit breakers 104 and circuit breaker controller 106 may communicate via wired (as opposed to wireless) technologies. For example, the communication enabled circuit breakers 104 may be communicatively coupled via a wired link to the circuit break controller 106.

The circuit breaker controller 106 may be configured to communicate via multiple communication components. For example, circuit breaker controller 106 may be configured to communicate with communication enabled circuit breakers 104 via BLE as described above. Additionally, the circuit breaker controller 106 can be configured to communicate (e.g., send and/or receive information elements including data, indications of operating conditions, instructions, updated fault interruption instructions, or the like) via a second wireless communication scheme or via a wired communication scheme. For example, the circuit breaker controller 106 could include wireless communication components arranged to communicate via Wi-Fi technology, thus enabling the circuit breaker controller 106 to communicate using Wi-Fi communication schemes. Accordingly, the circuit breaker controller 106 can communicate with devices external to the circuit breaker panel 102 via wireless channel 108, for example, using Wi-Fi communication schemes. In general, however, the circuit breaker controller 106 may be enabled to communicate with devices external to the circuit breaker panel 102 using any suitable type of communication technology, either wireless or wired (e.g., BLE, 4G, LTE, Wi-Fi, USB, RS232, MTP, etc.).

Components from the circuit breaker panel 102 may communicate (e.g., wirelessly or wired) with one or more remote entities 120. For example, the communication enabled circuit breakers 104 and/or the circuit break controller 106 of the circuit breaker panel 102 may communicate wirelessly with a mobile device 110 (e.g., tablet computer, mobile phone, etc.), a computing device 112 (desktop computer, server, etc.) and/or the Internet cloud 114. For example, the communication enabled circuit breakers 104-1 to 104-10 can communicate with the circuit breaker controller 106, which can itself, communication with any one of remote entities 120. It is noted, remote entities 120 are depicted including mobile device 110, computing device 112, and Internet 114. However, remote entities 120 could include just a single device or entity remote to circuit breaker panel 120. The term remote entities 120 is used herein to refer to one or more devices remote to the panel 120, such as, for example, mobile device 110, computing device 112, and Internet 114. Furthermore, although the term remote entity 120 is sometimes used herein in the plural, it is not intended to imply or denote multiple devices or multiple entities remote to panel 102 but could simply refer to a single entity remote to the system (e.g., just the Internet 114, just the mobile device 110, or the like).

More particularly, the circuit breakers 104 can wirelessly communicate with the circuit breaker controller 106, which can itself, wirelessly communicate with devices remote to the circuit breaker panel. In some examples, the wireless circuit breakers 104 can directly couple to devices remote to the circuit breaker panel 102. For example, the mobile device 110 can communicate directly (e.g., via BLE) with one of the wireless circuit breakers 104. In addition, the circuit breaker panel 102 may include wireline connectivity functionality, such as an Ethernet port, to enable wireline communication with one or more remote entities.

In some examples, the communication enabled circuit breakers 104-1 to 104-10 can directly couple to remote entities 120. For example, the mobile device 110 can communicate directly (e.g., via BLE) with at least one of the communication enabled circuit breakers 104-1 to 104-10. In addition, the circuit breaker panel 102 (e.g., via the circuit breaker controller 106) may include wireline connectivity functionality, such as an Ethernet port, to enable wireline communication with one or more remote entities. In some implementations, the communication enabled circuit breakers 104-1 to 104-10 may establish a mesh network. For example, communication enabled circuit breaker 104-1 may share a wireless connection with a remote entity 120 with communication enabled circuit breaker 104-2. Furthermore, in such a mesh network topology, communication enabled circuit breaker 104-2 may share the wireless connection to the remote entity 120 with communication enabled circuit breaker 104-3 and communication enabled circuit breaker 104-4. Therefore, using the mesh network topology, the wireless connection to the remote entity 120 may be shared between the communication enabled circuit breakers 104-1 to 104-10. The mesh network may be implemented in accordance with wireless communication schemes, or standards, such as, BLE standards, Wi-Fi standards, or the like.

The present disclosure provides that the communication enabled circuit breakers 104 and the circuit breaker controller 106 may communicate, or exchange signals including indications of data, operating conditions, fault detection events, fault interruption instructions, or the like. For example, the circuit breaker controller 106 may be configured to transmit updated software (e.g., operating software, firmware, fault interrupter instructions, etc.) to one or more of the communication enabled circuit breakers 104. For example, the circuit breaker controller 106 may provide, e.g., updated firmware to one or more of the communication enabled circuit breakers 104. Furthermore, the circuit breaker controller 106 may provide updated fault interrupter instructions to one or more of the communication enabled circuit breakers 104. The updated fault interrupter instructions may replace fault interrupter instructions stored in one or more of the communication enabled circuit breakers 104. The updated fault interrupter instructions may be received at the circuit breaker controller 106 from one or more remote entities 120 (e.g., mobile device 110, computing device 112 and/or the Internet cloud 114). The circuit breaker controller 106 may communicate updated fault interrupter instructions to one or more of the communication enabled circuit breakers 104 (e.g., using wireless or wired communication technologies). Alternatively, one or more remote entities 120 (e.g., mobile device 110, computing device 112 and/or the Internet cloud 114) may directly provide updated fault interrupter instructions to one or more of the communication enabled circuit breakers 104. To that end, the one or more remote entities 120 may communicate fault interrupter instructions to one or more of the communication enabled circuit breakers 104 (e.g., using BLE, or the like). The process of providing updated firmware and/or updated fault interrupter instructions may also be provided to other interrupter devices, such as AFCI/GFCI receptacles.

In general, fault interrupter instructions stored in the communication enabled circuit breaker 104 and/or updated fault interrupter instructions may include parameters of operating conditions intended to trigger a trip event. Said differently, the fault interrupter instructions and/or updated fault interrupter instructions can be configured to control fault condition detection algorithms and/or fault interruption characteristics of the communication enabled circuit breakers 104. For example, the fault interrupter instructions stored in the communication enabled circuit breaker 104 and/or updated fault interrupter instructions may define an overcurrent trip value in amps and an overcurrent trip response time in seconds. In addition, the fault interrupter instructions stored in the communication enabled circuit breaker 104 and/or updated fault interrupter instructions may define parameters associated with the communication enabled circuit breaker 104.

Such parameters may include current rating, voltage rating, time current curve characteristics (e.g., the relationship between the sensed overcurrent and the time required under which to trip the communication enabled circuit breaker 104), status, trip alarm, remote trip, single phase or three phase, and the like. In a particular implementation, the fault interrupter instructions stored in the communication enabled circuit breaker 104 and/or updated fault interrupter instructions may also include power metering instructions. The power metering instructions may enable the communication enabled circuit breaker 104 to measure energy, line and/or phase voltages, line frequency, line and/or phase current, and/or power consumption.

In one embodiment, the circuit breaker controller 106 includes a power supply that is coupled to a line side phase connection. Likewise, each of the communication enabled circuit breakers 104 includes a power supply that is coupled to a line side phase connection of the communication enabled circuit breaker (e.g., before the set of interruptible contacts of the communication enabled circuit breaker 104). The power supply may be a AC to DC converter, an AC to AC converter, or the like. In general, the power supply is provided to condition and/or convert a voltage of the line side phase and neutral electrical connections to one or more voltages that are supplied to components of the circuit breaker controller 106 and/or each of the communication enabled circuit breakers 104. Furthermore, the power supply may include one or more fuses to protect components of the circuit breaker controller 106 and/or each of the communication enabled circuit breakers 104. Advantageously, the circuit breaker controller 106 and/or each of the communication enabled circuit breakers 104 are supplied with power even in the event of a load side incident that causes one or more of the communication enabled circuit breakers 104 to trip.

In one embodiment, one or more of the communication enabled circuit breakers 104 are configured to automatically wirelessly transmit fault related information upon occurrence of a trip incident. In particular, one or more of the communication enabled circuit breakers 104 wirelessly transmits such fault related information to the circuit breaker controller 106. In one embodiment, the fault related information is transmitted using BLE. The fault related information may include, for example, recorded parameters that may have caused the trip incident, parameters used to determine that tripping the communication enabled circuit breaker 104 was necessary, a unique identifier of the communication enabled circuit breaker 104 that tripped (e.g., a unique wireless circuit breaker serial number, or the like), a time and date of the trip incident, a load signature that caused the trip incident, a zone or area that is without power as a result of the trip incident, etc. The circuit breaker controller 106 may disseminate the fault related information to one or more devices external of the circuit breaker panel 102. For example, the circuit breaker controller 106 may wirelessly transmit the fault related information to one of the remote entities 120. Therefore, a user or users of the remote entities 120 may be made immediately aware of the trip incident by way of at least the transmitted fault related information.

In another embodiment, one or more of the communication enabled circuit breakers 104 are configured to transmit status related information upon request by the circuit breaker controller 106. The request by the circuit breaker controller 106 may be communicated to one or more of the wireless circuit breakers 104 using any of the techniques discussed herein (e.g., wireless or wired). The status related information may include self-test related information provided by one or more of the communication enabled circuit breakers 104. In one implementation, the self-test related information may include operational status of components associated with one or more of the communication enabled circuit breakers 104.

As discussed above, one or more remote entities 120 (e.g., mobile device 110, computing device 112 and/or the Internet cloud 114) may directly communicate with one or more of the communication enabled circuit breakers 104. For example, the mobile device 110 may provide updated fault interrupter instructions to one or more of the communication enabled circuit breakers 104. In such an embodiment, the one or more remote entities 120 may communicate (e.g., via BLE) updated fault interrupter instructions directly to one or more of the communication enabled circuit breakers 104 without communicating through the circuit breaker controller 106. Direct communication between a remote entity 120 and the communication enabled circuit breakers 104 enables an electrician (or other suitable user) to interface in real-time with the communication enabled circuit breakers 104 and conduct a number of operations, all from within the same application on the remote entity. For example, the electrician may put a communication enabled circuit breaker 104 in a data acquisition/logging only mode, where when the communication enabled circuit breaker 104 is in the data acquisition only mode, the communication enabled circuit breaker 104 will not trip upon the occurrence of a fault but, rather, would pass the data in real-time to the remote entity 120 for analysis by either the remote entity 120, the electrician, or other suitable party.

For example, in the data acquisition only mode, the communication enabled circuit breaker 104 may be configured to not trip upon the occurrence of an arc fault, a ground fault, an overcurrent fault, or a combination of these. In other words, in the data acquisition only mode, the communication enabled circuit breaker 104 may be configured to trip upon detection of an overcurrent but not trip upon detection of an arc fault. In addition to the electrician, remote users may also communicate with the communication enabled circuit breaker 104 and/or the electrician via the same application on different devices. Additionally, the electrician can then iteratively make adjustments to the fault interrupter instructions and transmit updated fault interrupter instructions to the communication enabled circuit breaker 104 and analyze the resulting data from the communication enabled circuit breaker 104. In this manner, the fault interrupter instructions can be refined/tailored to avoid unintentional fault interrupts (e.g., nuisance tripping) of the communication enabled circuit breaker 104. This refinement of the fault interrupter instructions may be done for any particular communication enabled circuit breaker 104 as required, a plurality of communication enabled circuit breakers 104, or every communication enabled circuit breaker 104 in the circuit breaker panel 102. Likewise, the refinement of the fault interrupter instructions may be implemented across multiple installations or be implemented globally to all suitable breakers and in many or all installations. While the communication enabled circuit breaker 104 is in the data acquisition only mode, the communication enabled circuit breaker 104 may indicate, by any number of methods, when it would otherwise trip. Examples of such indication include flashing of LED(s) or transmitting the indication to the remote entity 120.

As described above, the present disclosure can be implemented to provide communication enabled circuit breakers 104, circuit breaker controller 106, and remote entities 120, arranged to communicate via either wired or wireless communication protocols and technologies. However, for clarity of presentation, the following examples depict and describe communication enabled circuit breakers 104 and a circuit breaker controller 106 arranged to communicate via wireless communication protocols. As such, many of the communication enabled circuit breakers 104 described in the following examples are referred to as "wireless circuit breakers" 104 or "communicating circuit breaker" 104. Likewise, the circuit breaker controller 106 may be referred to as a "wireless circuit breaker controller" 106. This is not intended to be limiting and the example breakers, controller, remote entities, techniques, and systems depicted and described below can be implemented with wired communication technologies without departing from scope of the disclosure. Additionally, the wireless circuit breakers 104 and the wireless circuit breaker controller 106 are described herein to communicate via BLE for purposes of convenience and clarity of presentation. This is also not intended to be limiting.

Figure 2:
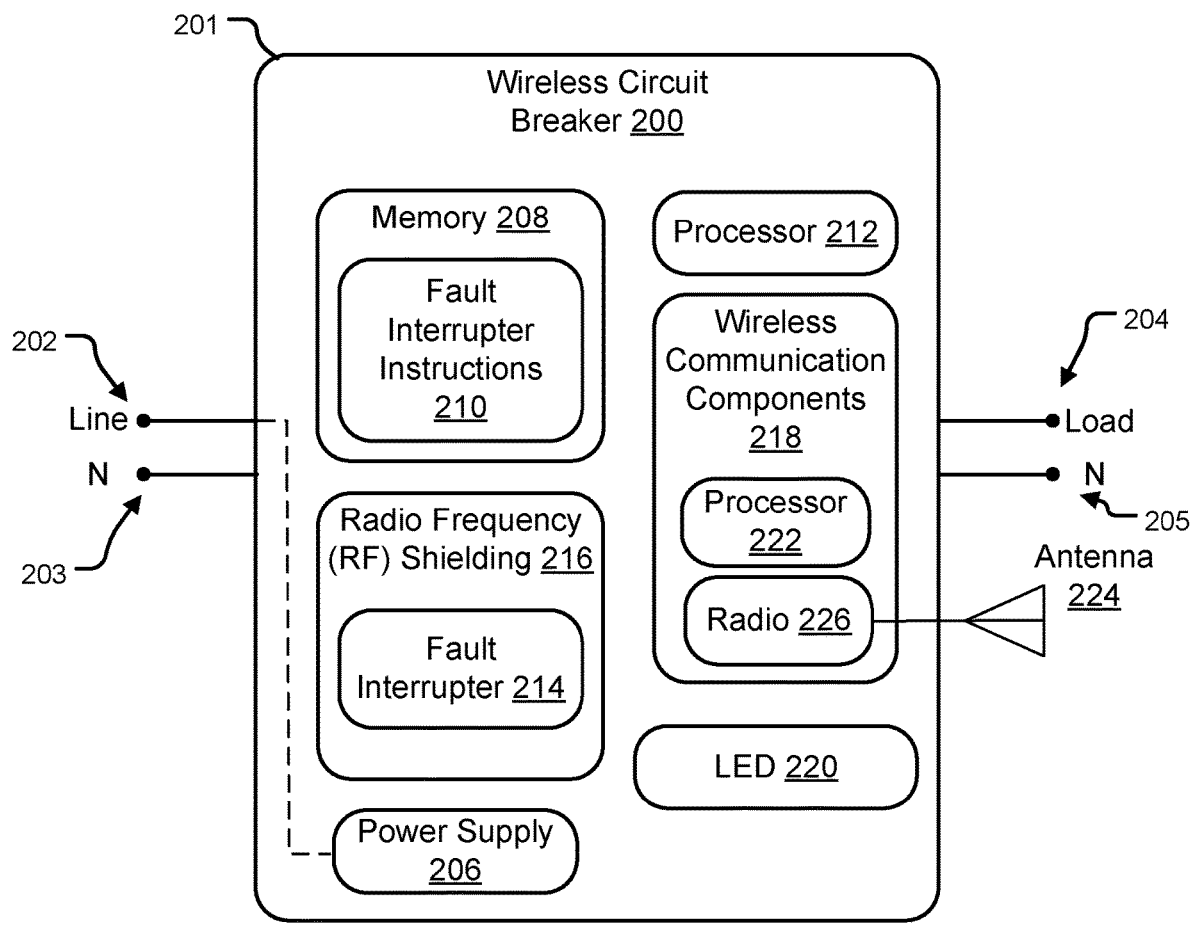
FIG. 2 illustrates a communication enabled circuit breaker in accordance with an exemplary embodiment.

FIG. 2 illustrates the wireless circuit breaker 200 in accordance with an exemplary embodiment. In some examples, the wireless circuit breaker 200 can be implemented as any one of the communication enabled circuit breakers 104-1 to 104-1 of the system 100 of FIG. 1. Generally, the wireless circuit breaker 200 may be used in a wide range of commercial, residential, and industrial circuit breaker panels. The wireless circuit breaker 200 may be configured to operate in conjunction with different electrical power distribution systems, including single-phase, split-phase, 3-phase delta, and 3-phase star. These systems may operate at any suitable voltage such as 120/240 (120V phase-neutral, 240 phase-to-phase), 120/208, 265/460, 277/480.

The wireless circuit breaker 200 includes multiple connections or "terminals." Specifically, wireless circuit breaker 200 includes a line side phase connection 202, a line side neutral connection 203, a load side phase connection 204, and a load side neutral connection 205. The line side phase connection 202 and line side neutral connection 203 are coupled to a power source. The load side power phase connection 204 and load side neutral connection 205 are coupled to a load. Thus, current can enter the wireless circuit breaker 200 via the line side phase connection 202, exit the wireless circuit breaker 200 via the load side phase connection 204, return to the wireless circuit breaker 200 via load side neutral connection 205, and travel back to the power source via line side neutral connection 203. The line side phase connection 202 and neutral connection 203 may be coupled to a power source (e.g., an electrical grid). The load side phase connection 204 and the load side neutral connection 205 may be coupled to branch circuit that may feed a load (e.g., HVAC system, refrigerator, TV, etc.).

The wireless circuit breaker 200 may include a power supply 206. The power supply 206 receives an input power from the line side phase connection 202 and line side neutral connection 203. The power supply 206 converts, in one implementation, an AC voltage to a regulated DC voltage for use by some or all of the electrical components associated with the wireless circuit breaker 200. To that end, the voltage provided by the power supply 206 is uninterrupted even when the wireless circuit breaker 200 is caused to trip as a result of a trip incident. In some examples, the power supply 206 includes circuitry to condition the current and/or voltage supplied to the electrical components of the wireless circuit breaker 200. In some examples, power supply 206 includes a fuse, which can in some embodiments be replaceable, to protect the power supply 206 and wireless circuit breaker 200 from overcurrent conditions. In some examples, power supply 206 itself includes a circuit breaker to protect the power supply 206 and wireless circuit breaker 200 from overcurrent conditions. With some examples, power supply 207 can be arranged to compensate for various electrical conditions that may be present on the input line for the panel system 102. For example, power supply 207 could be arranged to compensate for under-voltage conditions, filter interference, or the like.

A memory 208 is disposed in the wireless circuit breaker 200. The memory 208 is configured to store fault interrupter instructions 210. The memory 208 may comprise an article of manufacture. In some examples, the memory 208 may include any non-transitory computer readable medium or machine readable medium, such as an optical, magnetic or semiconductor storage. The memory 208 may store various types of computer executable instructions, such as the fault interrupter instructions 210. The memory 208 may be coupled to a processor 212. Processor 212 could be any of a variety of processors, such as, for example, a central processing unit, a microprocessor, a field programmable gate array, an application specific integrated circuit, or the like. Processor 212 can be arranged to execute fault interrupter instructions 210 to aid in performing one or more techniques described herein (e.g., cause the wireless circuit breaker 200 to trip, cause the wireless circuit breaker 200 to transmit information pertaining to a trip incident, etc.).

The wireless circuit breaker 200 includes a fault interrupter 214 or a "circuit interrupter" 214. In one implementation, the fault interrupter 214 is operable to interrupt faults (e.g., decouple the load side phase connection 204 from the line side phase connection 202) based in part on the fault interrupter instructions 210 stored in the memory 208. As used herein, the term "fault" could include any of a variety of conditions with which it may be desirable for the wireless circuit breaker 200 to disconnect the line side connection from the load side connection. For example, "fault" may be a fault within the breaker, a fault on the load side, a fault on the line side, or the like. As another example, "fault" may be a ground fault, an arc fault, an overcurrent fault, or the like. Examples are not limited in these contexts. The fault interrupter 214 may comprise various hardware elements. In one example, the fault interrupter 214 includes at least a trip solenoid and/or an energy storage element to trip the trip solenoid and cause the line side connection 202 to decouple from load side connection 204. In further examples, the fault interrupter 214 can include a reset solenoid and/or energy storage element to set the breaker 200 and cause the line side connection 202 to couple to the load side connection 204.

The fault interrupter instructions 210 may be executed (e.g., by fault interrupter 214, by processor 212, or the like) to cause the trip solenoid to break current flowing from the line side phase connection 202 to the load side phase connection 204 in specific conditions. For example, when the current exceeds a threshold defined by the fault interrupter instructions 210. In another example, the fault interrupter 214 includes functionality, controllable by way of the fault interrupter instructions 210, to sense characteristics of a line current, for example an amount of current, a frequency of the current, high-frequency current components, dynamic distribution of the frequency components over time and within a half cycle of a power line frequency, various profiles of power line characteristics, etc. As another example, the fault interrupter 214 includes functionality, controllable by way of the fault interrupter instructions 210, to set the breaker 200, such as, upon receipt of a control signal from a remote entity 120 where the control signal includes an indication to set the breaker.

The fault interrupter 214 may be sensitive to radio frequency (RF) signals (i.e., wireless signals). Therefore, the fault interrupter 214 may be partially or completely surrounded by an RF shielding 216. The RF shielding 216 may comprise any suitable material to attenuate wireless signals, for example, any ferrous material. In one implementation, the RF shielding 216 shields the fault interrupter 214 from wireless signals generated by the: wireless circuit breaker 200, other wireless circuit breakers 200, circuit breaker controller 106, and/or entities external of the circuit breaker panel 102 (e.g., remote entities 120, or the like).

The wireless circuit breaker 200 includes wireless communication components 218. The wireless communication components 218 enables the wireless circuit breaker 200 to communicate wirelessly using any suitable type of wireless communication technology as described herein. Therefore, the wireless communication components 218 may include at least a radio 226, antenna 224, and processor 222. In general, the radio 226 can be any radio configured to communicate using a wireless transmission scheme, such as, for example, BLE. The antenna 224 can be coupled to radio 224 and configured to emit and receive RF signals. For example, the antenna 224 can emit RF signals received from the radio 226 coupled between the radio 226 and the antenna 224. The antenna 224 could be any of a variety of antennas (or antenna arrays) having different shapes and/or configurations arranged to emit/receive radio waves on a particular frequency, range of frequencies, or the like. Furthermore, the antenna 224 could be internal to the housing 201 of the wireless circuit breaker 200 or external to the housing 201 of the wireless circuit breaker 200. Processor 222 can be any of a variety of processors (e.g., application processor, baseband processors, etc.) arranged to perform at least transmission and reception of wireless signals associated with the wireless circuit breaker 200.

As described, the wireless communication components 218 receives power from the power supply 206, which is coupled to the line side phase connection 202 and line side neutral connection 203. Therefore, the wireless communication components 218 enable the wireless circuit breaker 200 to communicate wirelessly even in the event that the fault interrupter 214 interrupts current flowing between the line side phase connection 202 and the load side phase connection 204.

An indicator may be implemented on the wireless circuit breaker 200. The indicator may be any suitable type of indicator such as a visual or audible indicator including but not limited to, an LED, neon bulb, and/or piezoelectric buzzer. In the present embodiment, the indicator is a light emitting diode (LED) 220. The LED 220 may be illuminated to a predefined color, illumination pattern, and/or illumination frequency, when the wireless circuit breaker 200 is in an update mode. The update mode indicates that the wireless circuit breaker 200 is ready to receive updated fault interrupter instructions for storage in the memory 208 from a remote entity 120. In some implementations, when the wireless circuit breaker 200 is an update mode, the wireless circuit breaker 200 is open or tripped. In some implementations, when the wireless circuit breaker 200 is an update mode, the wireless circuit breaker 200 is unable to provide tripping functionality.

The wireless circuit breaker 104 may comprise a housing 201. The housing 201 may be a miniature circuit breaker (MCB) housing. In some implementations, the MCB housing has a width of 1 inch. It is noted, that the dimensions of the breakers are given for example only. Breaker widths could be any width, e.g., ½ inch, ¾ inch, 1 inch, 1½ inches, 2 inches, or the like.

As noted above, with some implementations, wireless circuit breaker 200 can include a "diagnostic mode" or a data acquisition only mode. In such a mode, the wireless circuit breaker 200 may be configured to not trip upon occurrence of a selected faults. For example, the wireless circuit breaker 200 can be a combination AFCI/GFCI breaker. However, upon initialization of the data acquisition only mode, the breaker may be arranged to trip upon occurrence of a GFCI fault but not an AFCI fault. The wireless circuit breaker 200 can be arranged to log data (e.g., save indications of operating conditions, or the like) to memory 208. Such logged data may be transmitted to a remote entity (e.g., via circuit breaker controller, or the like) and used by a manufacturer or technician to diagnose false AFCI tripping and/or nuisance tripping issues and to generate and/or develop new firmware (which can include fault interruption instructions) for wireless circuit breaker 200.

With some examples, wireless circuit breaker 200 could be deployed as a "diagnostic breaker," which may include a handle (like the reset switch of conventional circuit breakers) to place the wireless circuit breaker 200 in the diagnostic mode. Furthermore, the wireless circuit breaker 200 may include multiple indications (e.g., LEDs 220, or the like). For example, wireless circuit breaker 200 could include an LED 220 arranged to illuminate when the breaker is in a normal mode (e.g., arranged to trip on AFCI, GFCI, or both AFCI and GFCI). As a specific example, the wireless circuit breaker 200 could include an LED 220 arranged to illuminate when the breaker is configured to monitor and trip for GFCI and another LED 220 arranged to illuminate when the breaker is configured to monitor and trip for AFCI. As another example, the wireless circuit breaker 200 could include an LED 220 to indicate when the breaker is in a diagnostic mode.

Figure 3:
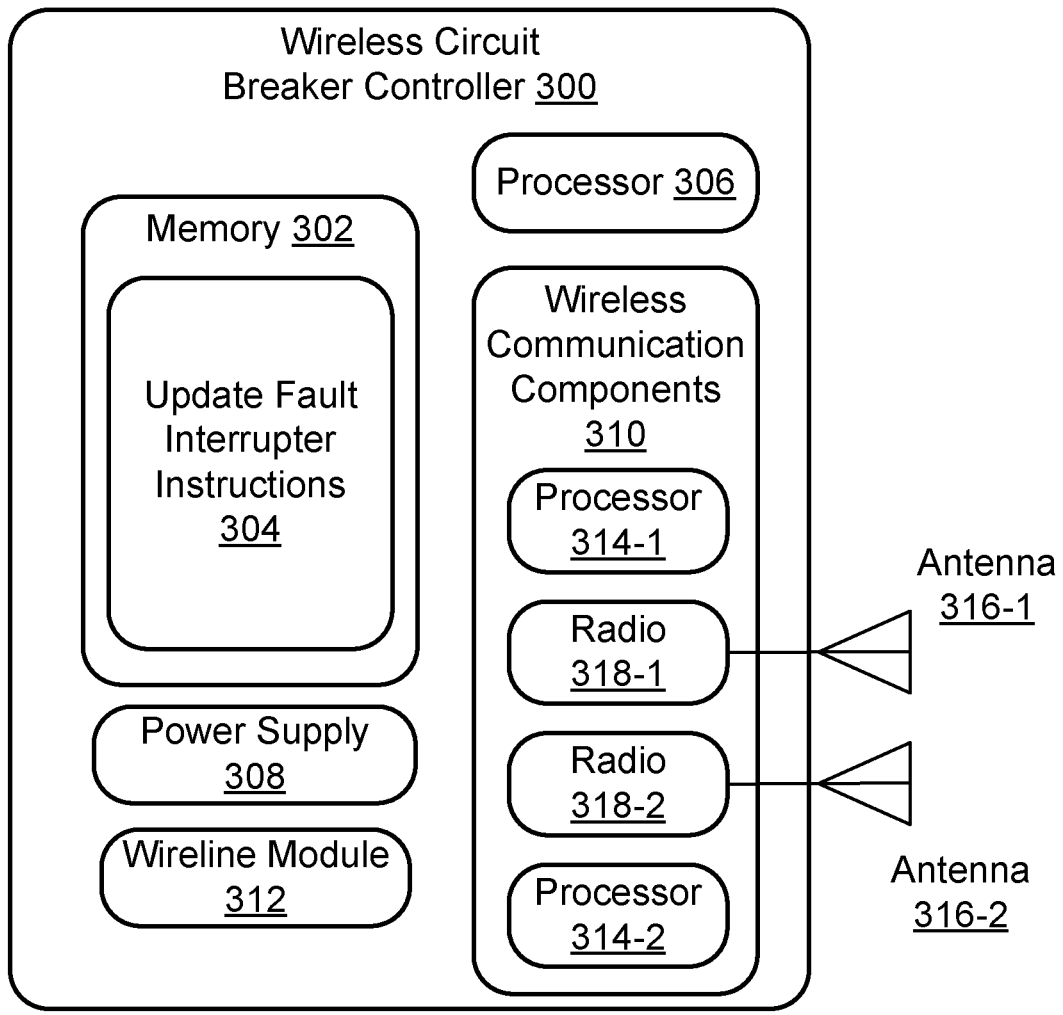
FIG. 3 illustrates a circuit breaker controller in accordance with an exemplary embodiment.

FIG. 3 illustrates the wireless circuit breaker controller 300 in accordance with an exemplary embodiment. In some examples, the wireless circuit breaker controller 300 can be implemented as the circuit breaker controller 106 of the system 100 of FIG. 1. Generally, the wireless circuit breaker controller 300 may be used a wide range of commercial, residential, and industrial circuit breaker panels. In one embodiment, the wireless circuit breaker controller 300 is implemented in the circuit breaker panel 102. In an alternative embodiment, the wireless circuit breaker controller 300 is coupled to the circuit breaker panel 102 in an external arrangement. For example, in an alternative implementation of the wireless circuit breaker controller 300, the wireless circuit breaker controller 300 is part of a mobile device, such as a mobile phone, having hardware/software functionality to enable the mobile device to function as the described wireless circuit breaker controller 300.

A memory 302 is disposed in the wireless circuit breaker controller 300. The memory 302 is configured to store updated fault interrupter instructions 304. The memory 302 may comprise an article of manufacture. In some examples, the memory 302 may include any non-transitory computer readable medium or machine readable medium, such as an optical, magnetic or semiconductor storage. The memory 302 may store various types of computable executable instructions, such as the updated fault interrupter instructions 304.

The memory 302 may be coupled to a processor 306. Processor 306 could be any of a variety of processors, such as, for example, a central processing unit, a microprocessor, a field programmable gate array, an application specific integrated circuit, or the like. Processor 306 can be arranged to execute instructions stored in the memory 302 to aid in performing one or more techniques described herein (e.g., cause the updated fault interrupter instructions 304 to be sent to one or more of the wireless circuit breakers 200, receive fault information including unique identifiers associated with wireless circuit breakers 200 and a time and date of a trip incident that caused fault interrupters 214 to interrupt the current flow between line side phase connection 202 and load side phase connection 204, etc.).

The wireless circuit breaker controller 300 may include a power supply 308. The power supply 308 is to convert, in one implementation, an AC voltage to a regulated DC voltage for use by some or all of the electrical components associated with the wireless circuit breaker controller 300. With some examples, power supply 308 can include multiple "hot" terminals and a neutral terminal. Thus, power supply 308 could receive power from either "hot" wire to provide redundancy. In the case of multi-phase systems, the power supply 308 could be arranged to couple to multiple phases to provide redundancy for the loss of one of phases.

The wireless circuit breaker controller 300 includes wireless communication components 310. The wireless communication components 310 enable the wireless circuit breaker controller 300 to communicate wirelessly using any suitable type of wireless communication technology (e.g., a short-range wireless/near field wireless technology, Bluetooth®, Wi-Fi, ZigBee®, etc.). Therefore, the wireless communication components 310 may include at least radio 318-1, which may include radio and transmitting and receiving circuitry, antenna 316-1, and processor 314-1. In general, the radio 318-1 can be any radio configured to communicate using a wireless transmission scheme, such as, for example, BLE. The antenna 316-1 can be coupled to radio 318-1 and configured to emit and receive RF signals. For example, the antenna 316-1 can emit RF signals received from the radio 318-1 coupled between the radio 318-1 and the antenna 316-1. The antenna 316-1 could be any of a variety of antennas (or antenna arrays) having different shapes and/or configurations arranged to emit/receive radio waves on a particular frequency, range of frequencies, or the like. Processor 314-1 can be any of a variety of processors (e.g., application processor, baseband processors, etc.) arranged to perform at least transmission and reception of wireless signals associated with the wireless circuit breaker controller 300. Furthermore, the antenna 316-1 could be internal to the physical housing of the wireless circuit breaker controller 300 or external to the housing of the wireless circuit breaker controller 300.

As detailed, some embodiments provide wireless communication components 310 of wireless circuit breaker controller 300 can be operable communicate over a number of wireless frequencies or schemes. As such, processor 314-1, radio 318-1 and antenna 316-1 could be arranged to communicate over multiple wireless communication technologies, such as, for example, BLE and Wi-Fi. In other examples, wireless communication components 310 can include multiple sets of processor, radio and antenna. For example, as depicted, components 310 further include radio 318-2, antenna 316-2 and processor 314-2. Thus, the first set of radio 318-1, antenna 316-1 and processor 314-1 can be arranged to communicate using a first wireless communication scheme, such as, BLE while the second set of radio 318-2, antenna 316-2 and processor 314-2 can be arranged to communicate using a second wireless communication scheme, such as, Wi-Fi.

The wireless circuit breaker controller 300 may further include a wireline network interface 312. The wireline network interface 312 enables the wireless circuit breaker controller 300 to be coupled via a wireline connection to various devices. For example, in one implementation, the wireless circuit breaker controller 300 is a standalone device that may be wireline connected (e.g., via Ethernet) to a remote device (e.g., Internet cloud 114) and wirelessly connected to breakers 104 within the circuit breaker panel 102. In such an example, the controller 300 could optionally omit one of the wireless communication components (e.g., wireless communication components 310 arranged to communicate via Wi-Fi, or the like). As another example, the wireless circuit breaker controller 300 could be wireless coupled to wireless circuit breakers (e.g., wireless circuit breaker 200, or the like) via wireless communication components 310 and coupled via a wired communication connection to other communication enabled circuit breakers (not shown) via wireline network interface 312.

Figure 4:
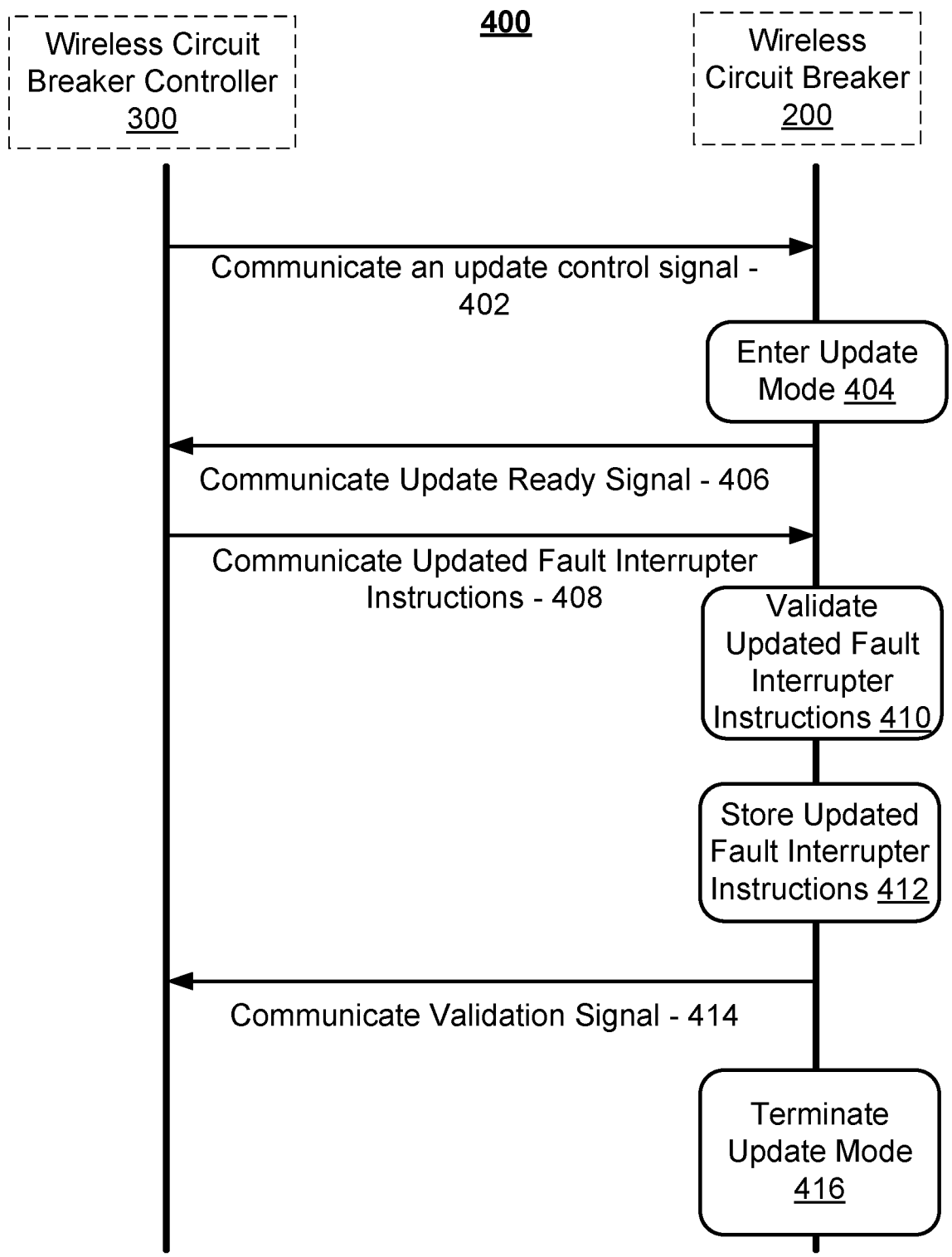
FIG. 4 illustrates a logic flow depicting communication between a circuit breaker controller and a communication enabled circuit breaker.
Figure 5:
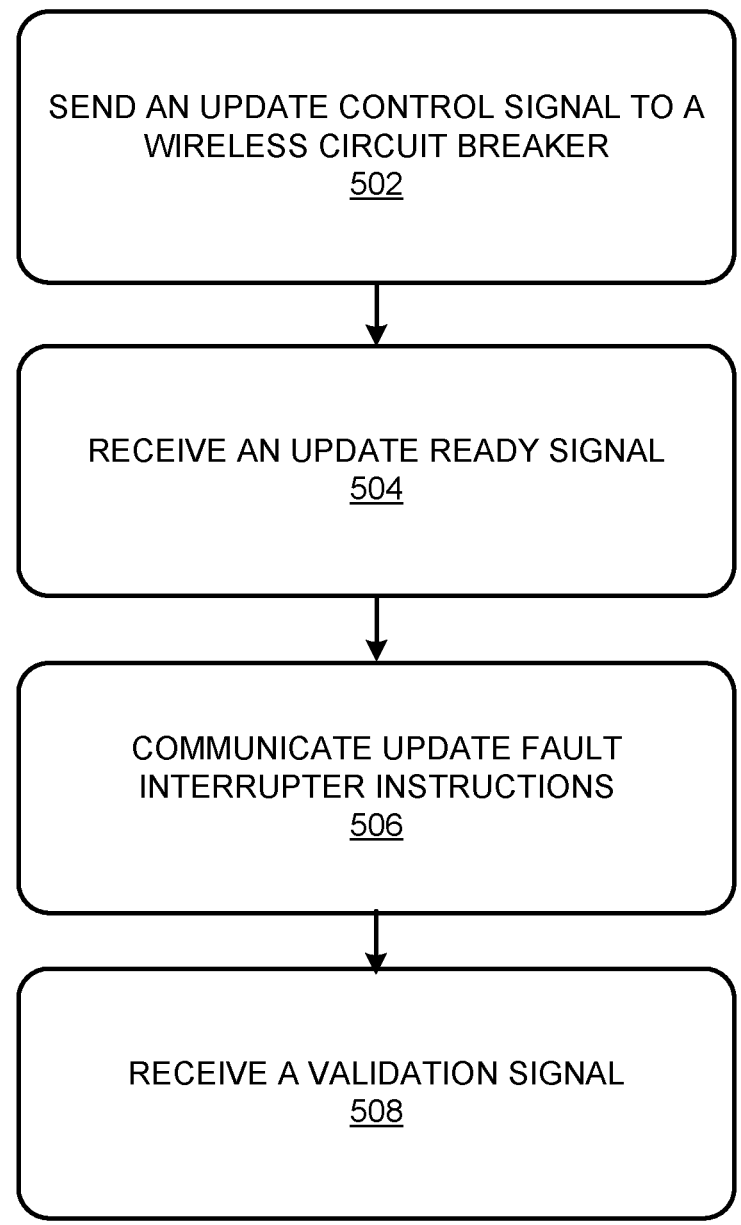
FIG. 5 illustrates a logic flow associated with a circuit breaker controller.
Figure 6:
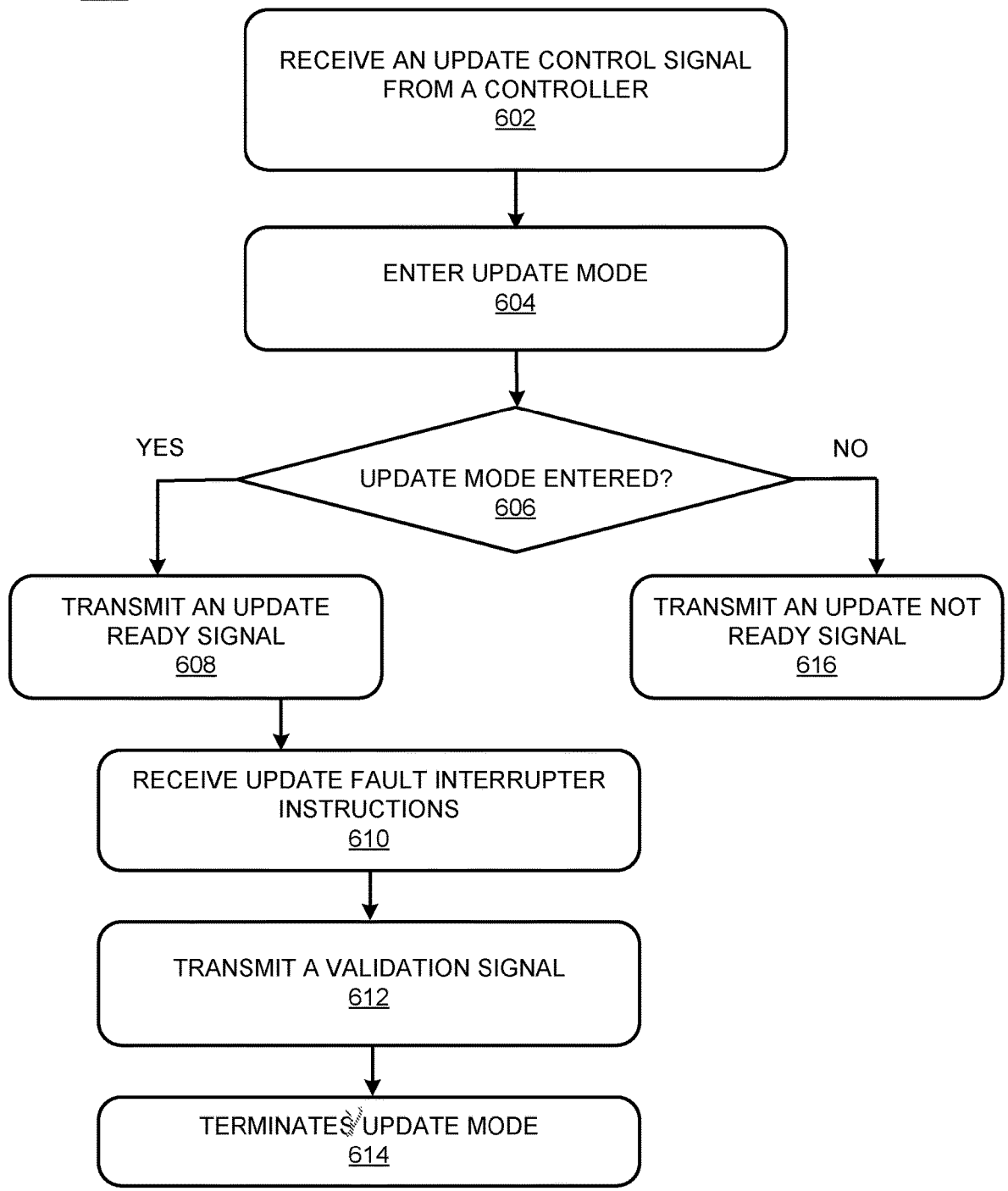
FIG. 6 illustrates a logic flow associated with a communication enabled circuit breaker.

FIGS. 4-6 illustrate logic flows, implementable by a communication enabled circuit breaker and panel system, such as, the system 100 of FIG. 1. In general, these logic flows can be implemented by any communication enabled circuit breaker and panel system or component(s) of such a system, such as, the system 100, communication enabled circuit breakers 104-n, circuit breaker controller 106, remote entity 120, communication enabled circuit breaker 200, circuit breaker controller 400, and/or the like. The following description of FIGS. 4-6 reference remote entity 120, controller 300 and breaker 200 for purposes of convenience and clarity only. However, it is to be understood that the logic flows described could be implemented by different combinations of components of a communication enabled circuit breaker and panel system without departing from the spirit and scope of the claimed subject matter.

Furthermore, it is noted that the operations for the depicted logic flows may occur sequentially and/or be made in parallel. Additionally, the operations for the depicted logic flows are not illustrated in a required order, unless dictated by the context or specifically states herein. That is, a different order other than that illustrated may be used. Some or all of the communications and operations associated with the logic flows may be embodied as one or more computer executable instruction. Such computer executable instructions may be stored in the storage medium, such as the memory 208 and/or the memory 302. A computing device, such as the processor 212 and/or the processor 306, may execute the stored computer executable instructions to implement the logic flows or cause the respective devices to implement the logic flows.

FIG. 4 illustrates a logic flow 400 depicting communication between a wireless circuit breaker controller 300 and a wireless circuit breaker 200. The logic flow 400 may provide updated fault interrupter instructions that may replace fault interrupter instructions stored in a memory. The left side of FIG. 4 shows communications transmitted and received by the wireless circuit breaker controller 300 while the right side of FIG. 4 shows communications transmitted and received by the wireless circuit breaker 200.

The logic flow 400 may begin with communication 402. However, the logic flow 400 may begin with a different communication other than the communication 402. At communication 402, the wireless circuit breaker controller 300 sends an update control signal to the wireless circuit breaker 200. The update control signal is to cause the wireless circuit breaker 200 to enter an update mode 404. For example, the update control signal may cause the wireless circuit breaker 200 to open or trip. Alternatively, the update control signal may cause the wireless circuit breaker 200 to disable tripping functionality while leaving the wireless circuit breaker 200 in the "closed" position. Furthermore, the wireless circuit breaker 200 may illuminate and associated LED (e.g., the LED 220) in the update mode. In one implementation, the LED will flash during the update mode. For example, the LED may flash red during the update mode and then transition to a solid green after the update mode is complete.

At communication 406, the wireless circuit breaker 200 communicates an update ready signal. The update ready signal indicates that the wireless circuit breaker 200 is ready to receive updated information, such as updated fault interrupter instructions. In some examples, the wireless circuit breaker 200 may only communicate an update ready signal if the wireless circuit breaker 200 is in the open position (e.g., update mode properly entered at 404, etc.). In one embodiment, the update ready signal may be communicated to include wireless circuit breaker 200 information that pertains to the wireless circuit breaker 200. In one implementation, the wireless circuit breaker information includes at least a unique identifier of the wireless circuit breaker 200 and information indicating functionalities associated with the wireless circuit breaker 200. For example, the information may identify that the wireless circuit breaker 200 is an AFCI, GFCI, or AFCI/GFCI, etc., wireless circuit breaker. The wireless circuit breaker information (e.g., the wireless circuit breaker type) may be used by the wireless circuit breaker controller to select appropriate updated fault interrupter instructions for communication to the wireless circuit breaker 200.

At communication 408, the wireless circuit breaker controller 300 communicates updated fault interrupter instructions to the wireless circuit breaker 200. At block 410, the wireless circuit breaker 200 validates the updated fault interrupter instructions received from the wireless circuit breaker controller 300. In one implementation, the validation process involves a checksum verification process in which a checksum associated with the updated fault interrupter instructions is compared against a checksum associated with fault interrupter instructions previously stored in the wireless circuit breaker 200. If the validation fails, the circuit breaker may not use the updated fault interrupter instructions to replace the fault interrupter instructions previously stored in the wireless circuit breaker 200. At block 412, the wireless circuit breaker stores the updated fault interrupter instructions and an associated memory. Storing the updated fault interrupter instructions in the associated memory may include overwriting at least a portion of the fault interrupter instructions previously stored in the associated memory of the wireless circuit breaker 200.

At communication 414, the wireless circuit breaker 200 communicates a validation signal to the wireless circuit breaker controller 300. The validation signal confirms that the updated fault interrupter instructions have been validated for storage in the wireless circuit breaker 200 and/or that the updated fault interrupter instructions have been stored in the associated memory of the wireless circuit breaker 200. At block 416, the wireless circuit breaker 200 terminates update mode. In some examples, the wireless circuit breaker 200 can perform a self-test or other integrity check operation after the updated process, and in some cases, prior to terminating the update mode. With some examples, the wireless circuit breaker 200 may be able to restore and/or return to to pre-update condition (e.g., restore firmware from a backup, or the like) if the self-test fails. FIG. 5 illustrates a logic flow 500 associated with a wireless circuit breaker controller such as wireless circuit breaker controller 300. The logic flow 500 may begin with block 502. At block 502, the wireless circuit breaker controller 300 sends an update control signal to a wireless circuit breaker (e.g., the wireless circuit breaker 200). The update control signal is to cause the wireless circuit breaker 200 to enter an update mode. The wireless circuit breaker 200 disables tripping functionality associated therewith in the update mode. For example, the update control signal may cause the wireless circuit breaker 200 to shut down or turn off. Alternatively, the update control signal may cause the wireless circuit breaker 200 to trip or open. Furthermore, the wireless circuit breaker 200 may illuminate and associated LED (e.g., the LED 220) in the update mode. In one implementation, the LED will flash during the update mode. For example, the LED may flash red during the update mode and then transition to a solid green after the update mode is complete.

At block 504, the wireless circuit breaker controller 300 receives an update ready signal. The update ready signal indicates that a wireless circuit breaker 200 is ready to receive updated information, such as updated fault interrupter instructions. In one embodiment, the update ready signal may be communicated to include wireless circuit breaker information that pertains to the wireless circuit breaker 200. In one implementation, the wireless circuit breaker information includes at least a unique identifier of the wireless circuit breaker 200 and information indicating functionalities associated with the wireless circuit breaker 200. For example, the information may identify that the wireless circuit breaker 200 is an AFCI, GFCI, or AFCI/GFCI, etc., wireless circuit breaker. The wireless circuit breaker information (e.g., the wireless circuit breaker type) may be used by the wireless circuit breaker controller 300 to select appropriate updated fault interrupter instructions for communication to the wireless circuit breaker 200.

At block 506, the wireless circuit breaker controller 300 communicates updated fault interrupter instructions to the wireless circuit breaker 200.

At block 508, the wireless circuit breaker controller 300 receives a validation signal. The validation signal confirms that the updated fault interrupter instructions have been validated for storage in the wireless circuit breaker 200 and/or that the updated fault interrupter instructions have been stored in the associated memory of the wireless circuit breaker 200.

FIG. 6 illustrates a logic flow 600 associated with a wireless circuit breaker 200. The logic flow 600 may begin with block 602. At block 602, a wireless circuit breaker 200 receives an update control signal or update command. The update control signal is to cause the wireless circuit breaker 200 to enter an update mode. In the update mode, the wireless circuit breaker 200 disables tripping functionality associated therewith. For example, the update control signal may cause the wireless circuit breaker 200 to shut down or turn off. Alternatively, the update control signal may cause the wireless circuit breaker 200 to trip or open. Furthermore, the wireless circuit breaker 200 may illuminate an indicator (e.g., the LED 220) in the update mode. In one implementation, the LED will flash during the update mode. For example, the LED may flash red during the update mode and then transition to a solid green after the update mode is complete.

At block 604, the wireless circuit breaker 200 enters update mode. For example, the wireless circuit breaker 200 can open to decouple the load side phase connection from the line side phase connection. At block 606, the wireless circuit breaker 200 determines whether the update mode was entered. For example, the wireless circuit breaker 200 can determine whether the fault interrupter is open or closed. From block 606, the logic flow 600 can branch based on whether the update mode was entered. In particular, as depicted, logic flow 600 can continue to block 608 based on a determination that the update was entered.

At block 608, the wireless circuit breaker 200 transmits an update ready signal. The update ready signal indicates that a wireless circuit breaker 200 is ready to receive updated information, such as updated fault interrupter instructions. In one embodiment, the update ready signal may be communicated to include wireless circuit breaker information that pertains to the wireless circuit breaker 200. In one implementation, the wireless circuit breaker information includes at least a unique identifier of the wireless circuit breaker 200 and information indicating functionalities associated with the wireless circuit breaker 200. For example, the information may identify that the wireless circuit breaker 200 is an AFCI, GFCI, or AFCI/GFCI, etc., wireless circuit breaker. The wireless circuit breaker information (e.g., the wireless circuit breaker type) may be used by the wireless circuit breaker controller 300 to select appropriate updated fault interrupter instructions for communication to the wireless circuit breaker 200.

At block 610, the wireless circuit breaker 200 receives updated fault interrupter instructions. In one implementation, the updated fault interrupter instructions are received from a wireless circuit breaker controller 300. At block 612, the wireless circuit breaker 200 transmits a validation signal. The validation signal confirms that the updated fault interrupter instructions have been validated for storage in the wireless circuit breaker and/or that the updated fault interrupter instructions have been stored in the associated memory of the wireless circuit breaker 200. At block 614, the wireless circuit breaker 200 terminates update mode.

As detailed, from block 606, the logic flow 600 can branch based on whether the update mode was entered. In particular, as depicted, logic flow 600 can continue to block 616 based on a determination that the update was not entered. At block 616, the wireless circuit breaker 200 transmits an update not ready signal.

Figure 7:
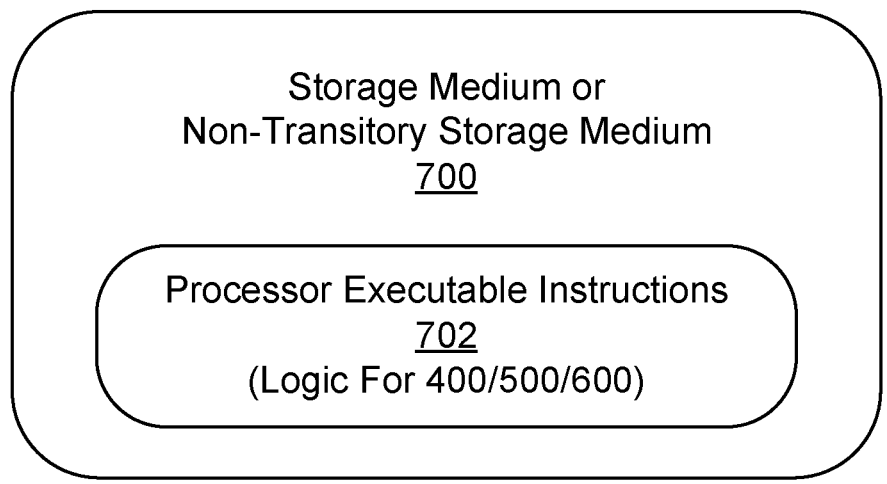
FIG. 7 illustrates an embodiment of a storage medium.

FIG. 7 illustrates an embodiment of a storage medium 700. The storage medium 700 may comprise an article of manufacture. In some examples, the storage medium 700 may include any non-transitory computer readable medium or machine readable medium, such as an optical, magnetic or semiconductor storage. Examples of a computer readable or machine-readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context. The memory 208 may be one or more memory chips capable of storing data and allowing any storage location to be directly accessed by the processor 212, such as any type or variant of static random-access memory (SRAM), dynamic random access memory (DRAM), electrically erasable programmable read-only memory (EEPROM), Ferroelectric RAM (FRAM), NAND Flash, NOR Flash and Solid State Drives (SSD).

The storage medium 700 may store various types of processor executable instructions e.g., 702). For example, storage medium 700 can be coupled to processor(s) described herein (e.g., processor 212, processor 222, processor 306, processor 314-1, processor 314-2, etc.) while such processor(s) can be arranged to execute instructions 702. Thus, the storage medium 700 may store various types of computer executable instructions to implement logic flow 400. The storage medium 700 may store various types of computer executable instructions to implement logic flow 500. The storage medium 700 may store various types of computer executable instructions to implement logic flow 600.

Examples of a computer readable or machine-readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

While a wireless circuit breaker and panel system, a wireless circuit breaker controller, wireless technology enabled circuit breakers and a method for using the same have been described with reference to certain embodiments, it will be understood by those skilled in the art that various changes may be made, and equivalents may be substituted without departing from the spirit and scope of the claims of the application. Other modifications may be made to adapt a particular situation or material to the teachings disclosed above without departing from the scope of the claims. Therefore, the claims should not be construed as being limited to any one of the particular embodiments disclosed, but to any embodiments that fall within the scope of the claims.

Furthermore, the following examples are provided to more fully described the embodiments of the present disclosure:

Example 1. A communicating circuit breaker for use in a panel system with a communicating circuit breaker controller, the communicating circuit breaker comprising: a line side phase connection; a load side phase connection; a memory comprising fault interrupter instructions; a circuit interrupter; a processor communicatively coupled to the memory and the circuit interrupter; and a wireless radio configured to communicate with the communicating circuit breaker controller, wherein the processor executes the fault interrupter instructions to cause the circuit interrupter to interrupt a current flow between the line side phase connection and the load side phase connection upon detection of a fault.

Example 2. The communicating circuit breaker of example 1, further comprising a power supply coupled to the line side phase connection.

Example 3. The communicating circuit breaker of example 1, further comprising a miniature circuit breaker (MCB) housing.

Example 4. The communicating circuit breaker of example 3, wherein the MCB housing has a width which does not exceed 1 inch.

Example 5. The communicating circuit breaker of example 1, wherein the communicating circuit breaker is configured to broadcast information related to the fault detection.

Example 6. The communicating circuit breaker of example 5, wherein the communicating circuit breaker is configured to broadcast the information automatically upon detection of the fault or when instructed by the communicating circuit breaker controller.

Example 7. The communicating circuit breaker of example 5, wherein the broadcast information includes one or more of a unique identifier of the communicating circuit breaker, a time stamp, and a date stamp.

Example 8. The communicating circuit breaker of example 1, further comprising radio frequency (RF) shielding material disposed at least partially around the communicating circuit interrupter.

Example 9. The communicating circuit breaker of example 1, wherein the wireless radio is configured to communicate using over a personal area network.

Example 10. The communicating circuit breaker of example 1, the memory further comprising a firmware and firmware update instructions, wherein the communicating circuit breaker is configured to receive via the wireless radio a firmware update command from the circuit breaker controller.

Example 11. The communicating circuit breaker of example 10, wherein the processor is configured to execute the firmware update instructions to cause the communicating circuit breaker to enter an update mode, the update mode comprising: the current flow between the line side phase connection and the load side phase connection being interrupted; preventing restoring of the current flow between the line side phase connection and the load side phase connection; and broadcasting a firmware update ready signal to the circuit breaker controller.

Example 12. The communicating circuit breaker of example 11, wherein the current flow is interrupted by the processor sending an interrupt control signal to the circuit interrupter upon executing the firmware update instructions.

Example 13. The communicating circuit breaker of example 12, wherein the current flow is prevented from being restored by the processor sending a reset disable control signal to the circuit interrupter upon executing the firmware update instructions.

Example 14. The communicating circuit breaker of example 11, wherein the current flow is interrupted by a manual operation of a user.

Example 15. The communicating circuit breaker of example 11, wherein the firmware update ready signal is not broadcast to the circuit breaker controller until both the current flow is interrupted and the current flow is prevented from being restored.

Example 16. The communicating circuit breaker of example 11, wherein the processor is configured to execute the firmware update instructions in the update mode to further cause the communicating circuit breaker to: receive an updated firmware from the circuit breaker controller via the wireless radio; and overwrite at least a portion of the firmware in the memory with the updated firmware.

Example 17. The communicating circuit breaker of example 16, wherein the processor is configured to execute the firmware update instructions in the update mode to further cause the communicating circuit breaker to: validate the updated firmware before overwriting the firmware in memory, the validation being based at least in part on a checksum validation.

Example 18. The communicating circuit breaker of example 10, wherein the processor is configured to execute the firmware update instructions to cause the communicating circuit breaker to send an information element via the wireless radio to the communicating circuit breaker controller comprising an indication of at least one of a circuit breaker type, a serial number, a model number, or a firmware version number.

Example 19. The communicating circuit breaker of example 1, wherein the communicating circuit breaker initiates communication via the wireless radio with the communicating circuit breaker controller automatically when the circuit interrupter interrupts the current flow between the line side phase connection and the load side phase connection.

Example 20. The communicating circuit breaker of example 1, wherein the communicating circuit breaker initiates a communication via the wireless radio with the communicating circuit breaker controller automatically upon detection of the fault.

Example 21. The communicating circuit breaker of example 20, wherein the communication includes fault information, the fault information including a unique identifier of the circuit breaker and a time and date of the fault detection.

Example 22. The communicating circuit breaker of example 10, wherein the firmware comprises the fault interrupter instructions.

Example 23. A communication enabled circuit breaker and panel system, comprising: a circuit breaker controller, comprising a first wireless radio; and at least one communication enabled circuit breaker, comprising: a line side phase connection; a load side phase connection; a memory comprising fault interrupter instructions; a circuit interrupter; a processor communicatively coupled to the memory and the circuit interrupter; and a second wireless radio configured to communicate with the first wireless radio, wherein the processor to execute the fault interrupter instructions to cause the circuit interrupter to interrupt a current flow between the line side phase connection and the load side phase connection upon detection of a fault.

Example 24. The communication enabled circuit breaker and panel system of example 23, the at least one communication enabled circuit breaker comprising, a power supply coupled to the line side phase connection.

Example 25. The communication enabled circuit breaker and panel system of example 23, comprising a miniature circuit breaker (MCB) housing, the at least one communicating circuit breaker disposed in the MCB housing.

Example 26. The communication enabled circuit breaker and panel system of example 25, wherein the MCB housing has a width which does not exceed 1 inch.

Example 27. The communication enabled circuit breaker and panel system of example 23, comprising a plurality of communication enabled circuit breakers, each of the plurality of communication enabled circuit breakers configured to broadcast information related to the fault detection.

Example 28. The communication enabled circuit breaker and panel system of example 27, wherein each of the plurality of communication enabled circuit breakers are configured to broadcast the information automatically upon detection of the fault or when instructed by the circuit breaker controller.

Example 29. The communication enabled circuit breaker and panel system of example 27, wherein the broadcast information includes one or more of a unique identifier of the communication enabled circuit breaker, a time stamp, or a date stamp.

Example 30. The communication enabled circuit breaker and panel system of example 23, the at least one communication enabled circuit breaker comprising radio frequency (RF) shielding material disposed at least partially around the circuit interrupter.

Example 31. The communication enabled circuit breaker and panel system of example 23, wherein the second wireless radio is a personal area network wireless radio.

Example 32. The communication enabled circuit breaker and panel system of example 23, the memory comprising a firmware and firmware update instructions, the at least one communication enabled circuit breaker to receive a command from the circuit breaker controller via a wireless communication channel established between the first wireless radio and the second wireless radio, the command to include an indication to update the firmware.

Example 33. The communication enabled circuit breaker and panel system of example 32, the processor to execute the firmware update instructions to cause the at least one communication enabled circuit breaker to enter an update mode, comprising: sending a control signal to the circuit interrupter to cause the circuit interrupter to interrupt a current flow between the line side phase connection and the load side phase; sending a control signal to the circuit interrupter to prevent restoring the current flow between the line side phase connection and the load side phase connection; and broadcast a firmware update ready signal to the circuit breaker controller in response to the at least one communication enabled circuit breaker entering the update mode.

Example 34. The communication enabled circuit breaker and panel system of example 33, the processor to execute the firmware update instructions to further cause the at least one communication enabled circuit breaker to: receive an updated firmware from the circuit breaker controller via the wireless communication channel; and overwrite at least a portion of the firmware in the memory with the updated firmware based on the at least one communication enabled circuit breaker entering the update mode.

Example 35. The communication enabled circuit breaker and panel system of example 34, the processor to execute the firmware update instructions to further cause the at least one communication enabled circuit breaker to: validate an of the updated firmware received from the circuit breaker controller based at least in part on a checksum validation; and overwrite at least a portion of the firmware in the memory with the updated firmware in response to the updated firmware passing the checksum validation.

Example 36. The communication enabled circuit breaker and panel system of example 33, the processor to execute the firmware update instructions to further cause the at least one communication enabled circuit breaker to send an information element to the circuit breaker controller comprising an indication of at least one of a circuit breaker type, a serial number, a model number, or a firmware version number.

Example 37. The communication enabled circuit breaker and panel system of example 23, wherein the first wireless radio initiates wireless communication with the second wireless radio automatically when the circuit interrupter interrupts the current flow between the line side phase connection and the load side phase connection.

Example 38. The communication enabled circuit breaker and panel system of example 37, the wireless communication includes at least fault information including a unique identifier of the circuit breaker and a time and date of a trip incident that caused the fault interrupter to interrupt the current flow between the line side phase connection and the load side phase connection.

Example 39. The communication enabled circuit breaker and panel system of example 32, wherein the firmware comprises the fault interrupter instructions.

Example 40. A method to update a wireless circuit breaker, comprising: wirelessly receiving an update control signal at the wireless circuit breaker; initiating an update mode of the wireless circuit breaker; wirelessly receiving updated fault interrupter instructions at the wireless circuit breaker; and validating the wirelessly received updated fault interrupter instructions.

Example 41. The method of example 40, wherein the updated control signal is received from a circuit breaker controller, a mobile phone, or the Internet.

Example 42. The method of example 40, comprising: updating the wireless circuit breaker based in part on the updated fault interrupter instructions; and running a self-test on the wireless circuit breaker in response to the update.

Example 43. The method of example 42, comprising restoring the wireless circuit breaker to a pre-update condition in response to a failure of the self-test.

Example 44. The method of example 40, comprising overwriting at least a portion of stored fault interrupter instructions with the updated fault interrupter instructions.

Example 45. The method of example 40, wherein initiating the update mode of the wireless circuit breaker comprises at least disabling resetting functionality of the wireless circuit breaker.

Example 46. The method of example 45, wherein initiating the update mode of the wireless circuit breaker comprises turning off the circuit breaker.

Example 47. The method of example 40, wherein initiating the update mode of the wireless circuit breaker comprises illuminating a light emitting diode (LED) of the wireless circuit breaker to indicate that the wireless circuit breaker is in the update mode.

Example 48. A wireless circuit breaker and panel system, comprising: a wireless circuit breaker controller, comprising a first wireless radio; and at least one wireless circuit breaker, comprising: a line side phase connection; a memory comprising fault interrupter instructions; a fault interrupter coupled to the memory, the fault interrupter to interrupt a current flow on the line side phase connection based at least in part on the fault interrupter instructions; and a second wireless radio coupled to the memory, the second wireless radio to receive a signal from the first wireless radio, the signal to include an indication to update the fault interrupter instructions.

Example 49. The wireless circuit breaker and panel system of example 48, the wireless circuit breaker comprising a load side phase connection, a power supply coupled to the line side phase connection, the memory, and the second wireless radio, the power supply configured to provide power to the memory and the second wireless radio, and the fault interrupter to interrupt a current flow between the line side phase connection and the load side phase connection based at least in part on the fault interrupter instructions.

Example 50. The wireless circuit breaker and panel system of example 48, comprising a miniature circuit breaker (MCB) housing, the at least one wireless circuit breaker disposed in the MCB housing.

Example 51. The wireless circuit breaker and panel system of example 50, the MCB housing has a width which does not exceed 1 inch.

Example 52. The wireless circuit breaker and panel system of example 48, comprising a plurality of wireless circuit breakers, each of the plurality of wireless circuit breakers comprising a second wireless radio and a processor, the processor of each of the plurality of wireless breakers configured to initiate wireless communication of the second wireless radio only in the event of a trip incident or when instructed by the wireless circuit breaker controller.

Example 53. The wireless circuit breaker and panel system of example 48, comprising a radio frequency (RF) shielding material at least partially surrounding the fault interrupter, the RF shielding material to attenuate wireless communication signals.

Example 54. The wireless circuit breaker and panel system of example 53, the wireless communication includes at least fault information including a unique identifier of the at least one wireless circuit breaker and a time and date of a trip incident that caused the fault interrupter to interrupt the current flow on the line side phase connection.

Example 55. The wireless circuit breaker and panel system of example 48, the second wireless radio initiates wireless communication with the wireless circuit breaker controller automatically when the fault interrupter interrupts the current flow on the line side phase connection.

Example 56. The wireless circuit breaker and panel system of example 48, the second wireless radio is a Bluetooth® enabled wireless radio.

Example 57. A wirelessly upgradable wireless circuit breaker, comprising: a line side phase connection; a load side phase connection; a memory comprising fault interrupter instructions; a fault interrupter coupled to the memory, the fault interrupter to interrupt a current flow between the line side phase connection and the load side phase connection based at least in part on the fault interrupter instructions; and a wireless radio coupled to the memory, the wireless radio to receive a wireless signal, the wireless signal to include an indication to update the fault interrupter instructions.

Example 58. The wirelessly upgradable wireless circuit breaker of example 57, comprising a power supply coupled to the line side phase connection, the memory, and the wireless radio, the power supply configured to source power from the line side phase connection and supply power to the memory and the wireless radio.

Example 59. The wirelessly upgradable wireless circuit breaker of example 57, comprising a miniature circuit breaker (MCB) housing, the wirelessly upgradable wireless circuit breaker disposed in the MCB housing.

Example 60. The wirelessly upgradable wireless circuit breaker of example 59, the MCB housing has a width of 1 inch.

Example 61. The wirelessly upgradable wireless circuit breaker of example 57, comprising a radio frequency (RF) shielding material at least partially surrounding the fault interrupter, the RF shielding material to attenuate wireless communication signals.

Example 62. The wirelessly upgradable wireless circuit breaker of example 57, the wireless radio initiates wireless communication automatically when the fault interrupter interrupts the current flow between the line side phase connection and the load side phase connection.

Example 63. The wirelessly upgradable wireless circuit breaker of example 62, the wireless communication includes at least fault information including a unique identifier of the wirelessly upgradable wireless circuit breaker and a time and date of a trip incident that caused the fault interrupter to interrupt the current flow between the line side phase connection and the load side phase connection.

Example 64. The wirelessly upgradable wireless circuit breaker of example 57, the wireless radio is a Bluetooth® enabled wireless radio.

Example 65. A method to update a wireless circuit breaker, comprising: wirelessly receiving an update control signal at the wireless circuit breaker; initiating an update mode of the wireless circuit breaker; wirelessly receiving updated fault interrupter instructions at the wireless circuit breaker; and validating the wirelessly received updated fault interrupter instructions.

Example 66. The method to update the wireless circuit breaker of example 65, comprising overwriting at least a portion of stored fault interrupter instructions with the updated fault interrupter instructions.

Example 67. The method to update the wireless circuit breaker of example 65, the initiating the update mode of the wireless circuit breaker includes at least disabling tripping functionality of the wireless circuit breaker.

Example 68. The method to update the wireless circuit breaker of example 65, the initiating the update mode of the wireless circuit breaker includes illuminating a light emitting diode (LED) of the wireless circuit breaker to indicate that the wireless circuit breaker is in the update mode.

Example 69. A method to provide updated fault interrupter instructions, comprising: wirelessly receiving an update ready signal indicating that a wireless circuit breaker is in an update mode; wirelessly transmitting updated fault interrupter instructions, the updated fault interrupter instructions wirelessly transmitted by a wireless circuit breaker controller; and receiving a validation signal indicating that the updated fault interrupter instructions were received by the wireless circuit breaker.

Example 70. The method to provide the updated fault interrupter instructions of example 69, the update ready signal indicates that the wireless circuit breaker has disabled tripping functionality of the wireless circuit breaker.

Example 71. The method to provide the updated fault interrupter instructions of example 69, the validation signal confirms that the updated fault interrupter instructions are stored in a memory of the wireless circuit breaker.

Example 72. The method to provide the updated fault interrupter instructions of example 69, comprising wirelessly transmitting an update control signal to the wireless circuit breaker, and wirelessly receiving the update ready signal in response to the update control signal, the update ready signal including wireless circuit breaker information.

Example 73. The method to provide the updated fault interrupter instructions of example 72, the wireless circuit breaker information includes at least a unique identifier of the wireless circuit breaker and information indicating functionalities associated with the wireless circuit breaker.

We claim:

1. A communicating circuit breaker for use in a panel system, the panel system having a plurality of communicating circuit breakers in a panel, the communicating circuit breaker comprising:
 a miniature circuit breaker (MCB) housing comprising:
 a memory to comprise circuit breaker instructions;
 a processor coupled with the memory to execute the circuit breaker instructions;
 a first wireless radio configured to establish a first direct wireless connection with a wireless circuit breaker controller in the panel; and
 a second wireless radio configured to establish a direct wireless connection with a mobile device that is separate from the panel system, wherein the mobile device is located outside of the panel of the panel system;
 wherein the communicating circuit breaker is configured to validate new circuit breaker instructions received from:
  the wireless circuit breaker controller via the first wireless radio; or the mobile device via the second wireless radio.

2. The communicating circuit breaker of claim 1 wherein the circuit breaker instructions comprise one or more selected from the group consisting of operating instructions or fault interrupter instructions.

3. The communicating circuit breaker of claim 1, wherein the second wireless radio is configured to communicate over a network with a remote entity.

4. The communicating circuit breaker of claim 1, wherein the second wireless radio comprises at least one of a personal area network radio, a cellular radio, another network radio, or a combination thereof.

5. The communicating circuit breaker of claim 1, wherein the second wireless radio is coupled with an antenna.

6. The communicating circuit breaker of claim 5, wherein the second wireless radio is configured to communicate with the mobile device via the antenna to:
 receive new circuit breaker instructions or an update for the circuit breaker instructions from the mobile device;
 receive other updated instructions;
 receive operating software;
 receive firmware;
 configure the communicating circuit breaker;
 report status information;
 transfer historical data;
 transfer diagnostic information; or
 a combination thereof.

7. The communicating circuit breaker of claim 1, wherein the wireless radios are configured to:
 wirelessly receive an update control signal at the communicating circuit breaker;
 initiate an update mode of the communicating circuit breaker;
 wirelessly receive updated circuit breaker instructions at the communicating circuit breaker;
 validate the wirelessly received updated circuit breaker instructions; and
 update the communicating circuit breaker with the wirelessly received updated circuit breaker instructions.

8. The communicating circuit breaker of claim 7, further comprising a fault interrupter, the processor to update the communicating circuit breaker with the wirelessly received updated circuit breaker instructions, the update configured to occur while the fault interrupter is in a tripped state.

9. The communicating circuit breaker of claim 8, the processor to reset a fault interrupter after updating the communicating circuit breaker with the wirelessly received updated circuit breaker instructions.

10. The communicating circuit breaker of claim 7, wherein the fault interrupter remains set while updating the communicating circuit breaker with the wirelessly received updated circuit breaker instructions.

11. A method for a communicating circuit breaker, for use with a communicating circuit breaker controller and a mobile device, within a panel of a panel system, the method comprising the steps of:
 executing, by a processor in a miniature circuit breaker (MCB) housing of the communicating circuit breaker, circuit breaker instructions to cause a circuit interrupter in the communicating circuit breaker to interrupt a current flow between a line side phase connection and a load side phase connection of the communicating circuit breaker upon detection of a fault;
 establishing a first direct wireless connection via a first wireless radio with a communicating circuit breaker controller in the panel;
 establishing a second direct wireless connection via a second wireless radio with a mobile device that is separate from the panel system and wherein the mobile device is located outside of the panel; and
 selectively transmitting information on the first and second direct wireless connections, wherein the information comprises one or more of a status, a trip alarm, fault information, or operating parameters;
 wherein the communicating circuit breaker is configured to validate new circuit breaker instructions received from:
  the communicating circuit breaker controller via the first wireless radio; or the mobile device via the second wireless radio.

12. The method of claim 11, wherein establishing one or more of the first direct wireless connection or establishing the second direct wireless connection comprises establishing at least one of a personal area network radio, a cellular radio, an other network radio, or a combination thereof.

13. The method of claim 11, further comprises communicating via an antenna coupled with the second wireless radio of the communicating circuit breaker to:
 receive new circuit breaker instructions or an update for the circuit breaker instructions from the mobile device via the antenna;
 receive other updated instructions;

receive operating software;
receive firmware;
configure the communicating circuit breaker, to report status information;
, te-transfer historical data;
transfer diagnostic information; or
a combination thereof.

14. The method of claim 11, further comprising:
wirelessly receiving an update control signal at the communicating circuit breaker;
initiating an update mode of the communicating circuit breaker;
wirelessly receiving updated circuit breaker instructions at the communicating circuit breaker;
validating the wirelessly received updated circuit breaker instructions; and
updating the communicating circuit breaker with the wirelessly received updated circuit breaker instructions.

15. The method of claim 11, wherein the step of updating the communicating circuit breaker with the wirelessly received updated circuit breaker instructions further comprises updating only a portion of the circuit breaker instructions.

16. The method of claim 15, wherein while in the update mode:
the communicating circuit breaker remains set; and
upon detection of a fault, the current flow between a line side phase connection and the load side phase connection is interrupted.

17. The method of claim 14, further comprising resetting a fault interrupter after updating the communicating circuit breaker with the wirelessly received updated circuit breaker instructions.

18. The method of claim 14, wherein a fault interrupter of the communicating circuit breaker remains set while updating the communicating circuit breaker with the wirelessly received updated circuit breaker instructions.

19. A machine-readable, non-transitory storage medium comprising instructions, which, when executed by a processor, causes the processor to perform operations to:
execute circuit breaker instructions to cause a fault interrupter of a communicating circuit breaker to interrupt a current flow between a line side phase connection and a load side phase connection of the communicating circuit breaker upon detection of a fault;
establish a first direct wireless connection via a first wireless radio with a communicating circuit breaker controller within a panel of a panel system, wherein the processor is within a miniature circuit breaker (MCB) housing of the communicating circuit breaker within the panel of the panel system;
establish a second direct wireless connection via a second wireless radio with a mobile device that is separate from the panel system and wherein the mobile device is located outside of the panel; and
selectively transmit information on the first and second direct wireless connections, wherein the information comprises one or more of a status, a trip alarm, fault information, or operating parameters for the communicating circuit breaker;
wherein the communicating circuit breaker is configured to validate new circuit breaker instructions received from:
the communicating circuit breaker controller via the first wireless radio; or the mobile device via the second wireless radio.

20. The storage medium of claim 19, wherein the operations to establish the first direct wireless connection and establish the second direct wireless connection comprises operations to establish at least one of a personal area network radio, a cellular radio, another network radio, or a combination thereof.

21. The storage medium of claim 19, wherein the operations further comprise operations to communicate via an antenna coupled with the second wireless radio, to receive new circuit breaker instructions or an update for the circuit breaker instructions from the mobile device, to receive other updated instructions, to receive operating software, to receive firmware, to configure the communicating circuit breaker, to report status information, to transfer historical data, to transfer diagnostic information, or a combination thereof.

22. The storage medium of claim 19, wherein the operations further comprise operations to:
wirelessly receive an update control signal at the communicating circuit breaker;
initiate an update mode of the communicating circuit breaker;
wirelessly receive updated circuit breaker instructions at the communicating circuit breaker;
validate the wirelessly received updated circuit breaker instructions; and
update the communicating circuit breaker with the wirelessly received updated circuit breaker instructions.

23. The storage medium of claim 22, wherein the operations further comprise operations to reset the fault interrupter after updating the communicating circuit breaker with the wirelessly received updated circuit breaker instructions.

24. The storage medium of claim 22, wherein the fault interrupter remains set while updating the communicating circuit breaker with the wirelessly received updated circuit breaker instructions.

25. The communicating circuit breaker of claim 1, wherein:
the communicating circuit breaker is a single-pole circuit breaker and the MCB housing has a width which does not exceed 1 inch; or
the communicating circuit breaker is a two-pole circuit breaker and the MCB housing has a width which does not exceed 2 inches.

* * * * *